(12) United States Patent
Pedder et al.

(10) Patent No.: US 11,982,246 B2
(45) Date of Patent: May 14, 2024

(54) METHODS AND SYSTEMS FOR ENGINE

(71) Applicant: Transportation IP Holdings, LLC, Norwalk, CT (US)

(72) Inventors: Jacob Kenneth Pedder, State College, PA (US); James Robert Mischler, Erie, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 254 days.

(21) Appl. No.: 17/450,101

(22) Filed: Oct. 6, 2021

(65) Prior Publication Data

US 2022/0163005 A1 May 26, 2022

Related U.S. Application Data

(60) Provisional application No. 63/117,339, filed on Nov. 23, 2020.

(51) Int. Cl.
*F02D 41/14* (2006.01)
*B61C 5/00* (2006.01)
(Continued)

(52) U.S. Cl.
CPC ........... *F02D 41/1498* (2013.01); *B61C 5/00* (2013.01); *F02D 35/027* (2013.01); *F02D 41/0025* (2013.01); *F02D 41/0027* (2013.01); *F02D 41/0082* (2013.01); *F02D 41/1402* (2013.01); *F02D 41/1497* (2013.01);
(Continued)

(58) Field of Classification Search
CPC .. F02D 19/00; F02D 19/0025; F02D 19/0027; F02D 19/0082; F02D 19/008; F02D 19/02; F02D 19/06; F02D 19/08; F02D 19/081; F02D 19/10; F02D 35/027; F02D 41/1497; F02D 41/1498; F02P 5/152; F02P 5/1527; B61C 5/00
See application file for complete search history.

(56) References Cited

U.S. PATENT DOCUMENTS

| 4,617,895 A | * | 10/1986 | Sakakibara | ........... F02P 5/1523 123/406.45 |
| 4,699,106 A | * | 10/1987 | Haraguchi | ............ G01L 23/225 123/406.39 |

(Continued)

FOREIGN PATENT DOCUMENTS

| CN | 102112723 A | 6/2011 |
| CN | 103597187 A | 2/2014 |

(Continued)

*Primary Examiner* — John M Zaleskas
(74) *Attorney, Agent, or Firm* — McCoy Russell LLP

(57) ABSTRACT

Methods and systems are provided for controlling fueling and mitigating knock in internal combustion engines, such as multi-fuel engines. In one example, a method may include monitoring a frequency of knock events corresponding to one or more engine cylinders, and dynamically increasing a substitution ratio while the frequency of knock events is less than a maximum action threshold. In some examples, the method may further include actively adjusting one or more engine operating conditions to decrease the substitution ratio responsive to a severity of knocking in the one or more engine cylinders being greater than or equal to a threshold severity.

20 Claims, 7 Drawing Sheets

(51) Int. Cl.
*F02D 35/02* (2006.01)
*F02D 41/00* (2006.01)
*F02P 5/152* (2006.01)

(52) U.S. Cl.
CPC .... *F02P 5/1527* (2013.01); *F02D 2200/0414* (2013.01); *F02D 2200/1002* (2013.01); *F02D 2200/703* (2013.01); *F02P 5/152* (2013.01)

(56) References Cited

U.S. PATENT DOCUMENTS

| | | | | |
|---|---|---|---|---|
| 4,711,212 A * | 12/1987 | Haraguchi | F02P 5/152 | 123/435 |
| 4,899,711 A * | 2/1990 | Tabara | F02P 5/152 | 123/406.38 |
| 5,101,790 A * | 4/1992 | Takasu | F02D 41/1498 | 123/406.38 |
| 5,355,853 A * | 10/1994 | Yamada | G01L 23/225 | 123/406.38 |
| 6,000,384 A * | 12/1999 | Brown | F02D 41/2458 | 123/436 |
| 6,145,491 A * | 11/2000 | Wilstermann | G01L 23/225 | 123/406.35 |
| 6,561,163 B1 * | 5/2003 | Takahashi | F02D 35/021 | 123/406.29 |
| 6,688,286 B2 | 2/2004 | Kokubo et al. | | |
| 6,736,109 B2 | 5/2004 | Hoshino | | |
| 2001/0052336 A1 * | 12/2001 | Tanaya | G01L 23/221 | 123/406.29 |
| 2002/0078918 A1 * | 6/2002 | Ancimer | F02B 7/08 | 123/304 |
| 2004/0084022 A1 * | 5/2004 | Kinose | G01L 23/225 | 123/406.35 |
| 2004/0089056 A1 * | 5/2004 | Tanaya | G01L 23/225 | 73/35.08 |
| 2004/0118557 A1 * | 6/2004 | Ancimer | F02B 23/0672 | 166/227 |
| 2005/0109316 A1 * | 5/2005 | Oda | F02D 19/0692 | 123/406.29 |
| 2005/0234632 A1 * | 10/2005 | Masuda | G01L 23/225 | 701/111 |
| 2005/0251320 A1 * | 11/2005 | Kasashima | F02P 5/152 | 701/111 |
| 2006/0129304 A1 * | 6/2006 | Takemura | G01L 23/225 | 701/111 |
| 2006/0243030 A1 * | 11/2006 | Oe | G01L 23/225 | 73/35.09 |
| 2006/0288981 A1 * | 12/2006 | Kaneko | F02P 5/1527 | 123/406.37 |
| 2006/0288982 A1 * | 12/2006 | Kaneko | F02D 35/027 | 123/406.39 |
| 2007/0016387 A1 * | 1/2007 | Takemura | F02D 35/027 | 701/111 |
| 2007/0044753 A1 * | 3/2007 | Brehob | F02M 43/04 | 123/304 |
| 2007/0067091 A1 * | 3/2007 | Takemura | G01L 23/225 | 701/111 |
| 2007/0084266 A1 * | 4/2007 | Kaneko | F02D 35/027 | 73/35.03 |
| 2007/0084267 A1 * | 4/2007 | Iwade | G01L 23/225 | 73/35.03 |
| 2007/0125321 A1 * | 6/2007 | Ritter | F02D 19/023 | 123/526 |
| 2007/0157912 A1 * | 7/2007 | Ritter | F02D 19/0631 | 123/526 |
| 2007/0175444 A1 * | 8/2007 | Kaneko | G01L 23/225 | 123/406.16 |
| 2007/0214869 A1 * | 9/2007 | Kaneko | G01L 23/225 | 73/35.09 |
| 2007/0215108 A1 * | 9/2007 | Kaneko | F02P 5/152 | 123/406.34 |
| 2007/0215109 A1 * | 9/2007 | Kaneko | G01L 23/225 | 123/406.29 |
| 2007/0289575 A1 * | 12/2007 | Yoshihara | F02P 5/152 | 123/406.29 |
| 2008/0234918 A1 * | 9/2008 | Kaneko | F02D 35/027 | 701/111 |
| 2008/0264150 A1 * | 10/2008 | Oe | G01L 23/225 | 73/35.09 |
| 2008/0294328 A1 * | 11/2008 | Kaneko | G01L 23/225 | 701/111 |
| 2008/0306677 A1 * | 12/2008 | Iwade | G01L 23/225 | 701/111 |
| 2009/0095546 A1 * | 4/2009 | Zubeck | F02D 41/0027 | 180/54.1 |
| 2009/0120410 A1 * | 5/2009 | Kaneko | F02P 5/152 | 701/111 |
| 2009/0158816 A1 * | 6/2009 | Kaneko | G01L 23/225 | 73/35.09 |
| 2009/0159057 A1 * | 6/2009 | Pursifull | F02D 19/0692 | 123/456 |
| 2010/0174472 A1 * | 7/2010 | Matsushima | F02P 5/152 | 701/111 |
| 2011/0017174 A1 * | 1/2011 | Ulrey | F02D 19/0694 | 123/456 |
| 2011/0224889 A1 * | 9/2011 | Imamura | F02B 19/108 | 701/111 |
| 2011/0259298 A1 * | 10/2011 | Imamura | F02M 21/0284 | 123/436 |
| 2011/0288744 A1 | 11/2011 | Gokhale et al. | | |
| 2012/0041665 A1 * | 2/2012 | Pursifull | F02D 19/0692 | 701/103 |
| 2012/0080008 A1 * | 4/2012 | Matsushima | F02D 41/2451 | 123/436 |
| 2012/0296558 A1 * | 11/2012 | Ono | F02P 5/152 | 701/111 |
| 2013/0255628 A1 * | 10/2013 | Moren | F02B 69/04 | 123/406.29 |
| 2013/0311066 A1 * | 11/2013 | Guimaraes | F02D 41/3094 | 701/104 |
| 2013/0325295 A1 * | 12/2013 | Klingbeil | F02D 41/0025 | 701/104 |
| 2014/0000557 A1 * | 1/2014 | Glugla | F02D 41/008 | 123/434 |
| 2014/0041439 A1 * | 2/2014 | Matsushima | G01L 23/226 | 73/35.09 |
| 2014/0172280 A1 * | 6/2014 | Ogata | F02D 35/027 | 701/111 |
| 2014/0238340 A1 * | 8/2014 | Dunn | F02D 19/0642 | 123/299 |
| 2014/0331642 A1 * | 11/2014 | Dearth | F02D 19/0647 | 60/273 |
| 2014/0331970 A1 * | 11/2014 | Bidner | F02D 19/10 | 123/435 |
| 2014/0373822 A1 * | 12/2014 | Rosswurm | F02D 41/0025 | 123/676 |
| 2015/0059686 A1 * | 3/2015 | Glugla | F02D 41/402 | 123/445 |
| 2015/0159573 A1 * | 6/2015 | Glugla | F02P 5/045 | 701/103 |
| 2015/0176509 A1 * | 6/2015 | Lavertu | F02D 41/0027 | 123/27 GE |
| 2015/0219027 A1 | 8/2015 | zur Loye et al. | | |
| 2015/0226144 A1 * | 8/2015 | Sixel | F02D 35/023 | 123/90.15 |
| 2015/0240738 A1 * | 8/2015 | Yerace | F02D 29/02 | 123/27 GE |
| 2015/0322904 A1 * | 11/2015 | Leone | F02M 26/43 | 701/104 |
| 2016/0010581 A1 * | 1/2016 | Sixel | F02D 41/3005 | 123/445 |
| 2016/0032847 A1 * | 2/2016 | Suzuki | F02B 41/22 | 123/435 |
| 2016/0069252 A1 * | 3/2016 | Lavertu | F02D 19/0647 | 123/435 |
| 2016/0108828 A1 * | 4/2016 | Glugla | F02D 35/025 | 123/344 |
| 2016/0115882 A1 * | 4/2016 | Imhof | F02D 35/027 | 123/525 |

(56) References Cited

U.S. PATENT DOCUMENTS

| | | | |
|---|---|---|---|
| 2016/0123249 A1* | 5/2016 | Sakayanagi | G01L 23/22 701/111 |
| 2016/0146125 A1* | 5/2016 | Jung | F02D 41/403 123/478 |
| 2016/0153375 A1* | 6/2016 | Klingbeil | F02D 41/0027 123/577 |
| 2016/0281615 A1* | 9/2016 | Flynn | F02D 41/0025 |
| 2017/0089273 A1* | 3/2017 | Thomas | F02D 19/0642 |
| 2017/0089278 A1* | 3/2017 | Tulapurkar | F02D 35/027 |
| 2017/0101944 A1* | 4/2017 | Umeno | G06F 17/18 |
| 2017/0122246 A1* | 5/2017 | Ottikkutti | F02D 41/401 |
| 2017/0234245 A1 | 8/2017 | Bruner et al. | |
| 2017/0276075 A1* | 9/2017 | Devani | F02B 29/0493 |
| 2018/0238225 A1* | 8/2018 | Yerace | F02D 19/061 |
| 2019/0032582 A1* | 1/2019 | Tinschmann | F02D 19/081 |
| 2019/0093572 A1* | 3/2019 | Kim | F02D 41/266 |
| 2019/0120163 A1* | 4/2019 | Hillebrecht | F02D 41/3064 |
| 2019/0219471 A1* | 7/2019 | Jean | F02D 35/023 |
| 2019/0257253 A1* | 8/2019 | Klingbeil | F02D 19/0642 |
| 2019/0331034 A1* | 10/2019 | Nair | F02D 35/027 |
| 2019/0345886 A1* | 11/2019 | Pedder | F02D 41/0085 |
| 2020/0003137 A1* | 1/2020 | Pedder | F02D 19/081 |
| 2021/0301714 A1* | 9/2021 | Klingbeil | F02M 37/0064 |
| 2021/0310430 A1* | 10/2021 | Fisher | F02D 41/22 |
| 2021/0404371 A1* | 12/2021 | Yerace | F02D 41/1497 |
| 2021/0404372 A1* | 12/2021 | Klingbeil | F02D 29/02 |
| 2022/0034284 A1* | 2/2022 | Klingbeil | F02D 19/0644 |

FOREIGN PATENT DOCUMENTS

| | | | | |
|---|---|---|---|---|
| CN | 110469413 A | | 11/2019 | |
| DE | 60303634 T2 | | 12/2006 | |
| DE | 10243612 B4 | | 7/2008 | |
| DE | 102009034220 A1 | | 7/2010 | |
| DE | 102015117148 A1 | | 4/2016 | |
| JP | 2007247569 A | * | 9/2007 | |
| JP | 2007247569 A | | 9/2007 | |
| JP | 4297734 B2 | | 7/2009 | |
| JP | 5546595 B2 | | 7/2014 | |
| KR | 20140132827 A | * | 11/2014 | |
| WO | WO-2011128692 A1 | * | 10/2011 | F02D 19/0647 |

\* cited by examiner

METHODS AND SYSTEMS FOR ENGINE

CROSS REFERENCE TO RELATED APPLICATIONS

The present application claims priority to U.S. Provisional Application No. 63/117,339, entitled "METHODS AND SYSTEMS FOR ENGINE," and filed on Nov. 23, 2020. The entire contents of the above-listed application are hereby incorporated by reference for all purposes.

BACKGROUND

Technical Field

Embodiments of the subject matter disclosed herein relate to methods and systems for knock mitigation and fueling control, particularly in multi-fuel engines.

Discussion of Art

A multi-fuel engine may combust a plurality of fuels in engine cylinders of the engine. As one example, the multi-fuel engine may be a dual fuel engine, capable of combusting both natural gas and (liquid) diesel fuel. Adjusting fueling to the engine cylinders of the dual fuel engine may include adjusting a substitution ratio of the two fuels delivered to the engine cylinders. As one example, the substitution ratio may be defined as a ratio of a secondary fuel (e.g., natural gas) to total fuel [a sum total of a primary fuel (e.g., diesel fuel) and the secondary fuel] delivered to the engine cylinders for combustion. As another example, the substitution ratio may be defined according to a gross indicated torque basis, with the substitution ratio being a ratio of gas fuel energy (e.g., torque derived from combustion of natural gas) to total fuel energy (e.g., a sum total of torque derived from combustion of natural gas and diesel fuel). Maximizing the substitution ratio may be advantageous, as natural gas may be cheaper to combust.

Under various fueling and engine operating conditions, and across variable ambient conditions, one or more of the engine cylinders may experience knock. Knock sensors may be coupled to the multi-fuel engine to indicate when and where such knocking occurs. Knocking, which may be undesirable to a vehicle operator, may be mitigated via numerous control strategies. As an example, in dual fuel engines, knock may be reduced and controlled via a fast reactive strategy (e.g., actively reacting to moderate knock events to reduce severe knock events). However, eliminating moderate knock events with the fast reactive strategy alone may be difficult. It may be desirable to have a system and a method that differ from those that are currently available.

BRIEF DESCRIPTION

In one embodiment, a method for a multi-fuel engine may include monitoring a frequency of knock events corresponding to one or more cylinders of the multi-fuel engine, and, in a first mode, dynamically increasing a substitution ratio of the one or more cylinders while the frequency of knock events is less than a maximum action threshold.

DETAILED DESCRIPTION

Figure 1:
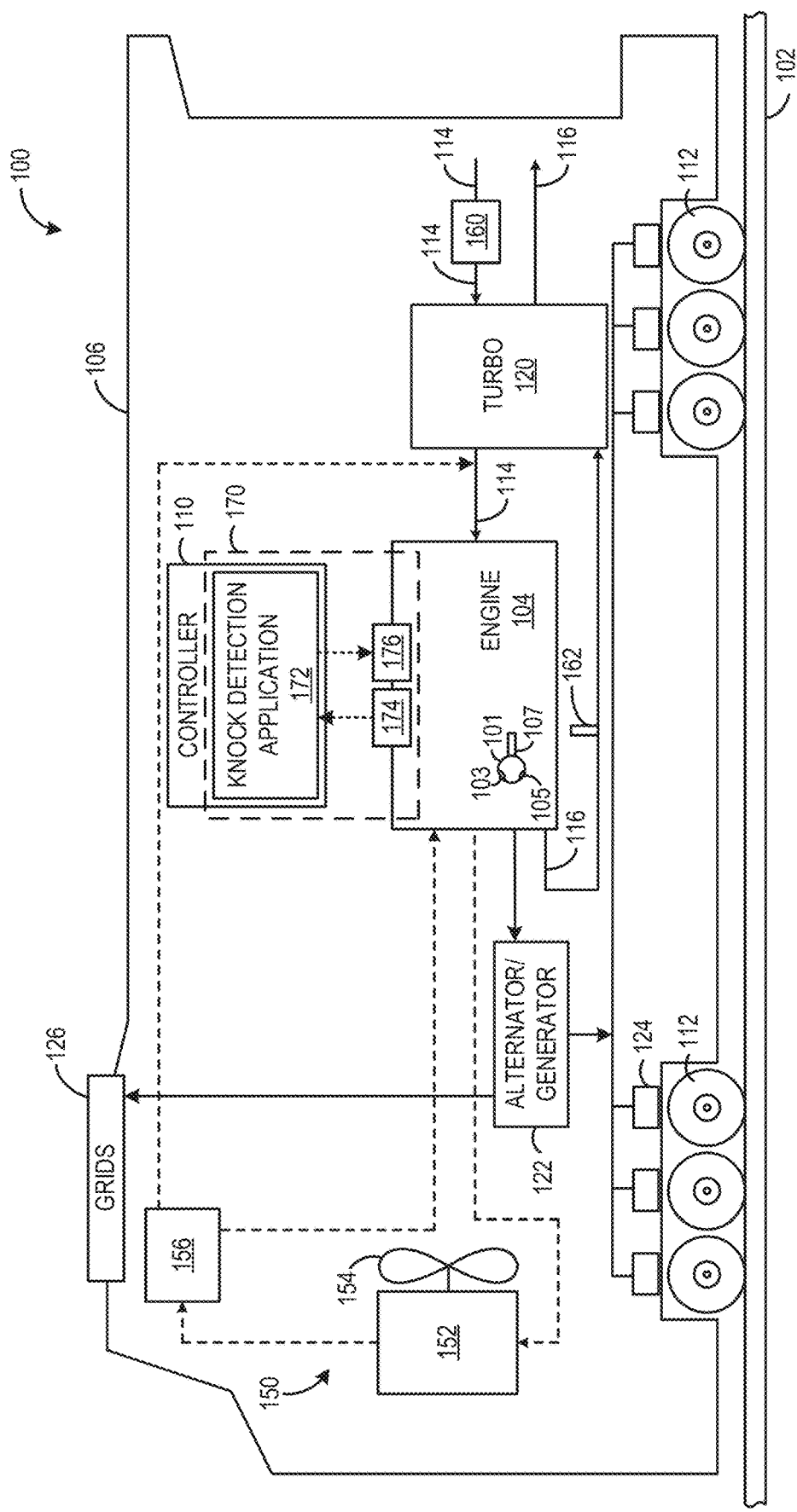
FIG. 1 shows a schematic diagram of a vehicle with an exemplary knock detection system for detecting knock in cylinders of an engine.

The following description relates to systems and methods for fueling control in an internal combustion engine of a vehicle system. For instance, the internal combustion engine may be a multi-fuel engine, operation of which may be described in terms of a number of engine operating conditions and ambient conditions. Some such conditions (e.g., substitution ratio, injection timing, rail pressure, etc.) may be actively adjustable, while others may be less controllable (e.g., inlet air temperature, ambient humidity, air/fuel ratio, fuel quality, unit-to-unit variations, etc.). To achieve desired engine operation over a wide range of operating states and ambient environments, each condition may depend on numerous other conditions (e.g., a desirable substitution ratio may depend on engine speed, engine power, ambient temperature, altitude, etc.). To simplify calibration and reduce memory requirements of a vehicle controller, it may therefore be desirable to dynamically adjust a controllable condition on the basis of a single condition which trends with still further conditions, such that optimization of the controllable condition may be performed in a substantially linear fashion. Accordingly, a preprogrammed response of the controllable condition to a plurality of uncontrollable or less controllable conditions may be implemented with minimal overhead.

For example, maximizing the substitution ratio may rigorously constitute a multifactorial problem, further complicated by a propensity of engine cylinders of the multi-fuel engine to knock responsive to excess secondary (gaseous) fuel (e.g., relatively high substitution ratios, such as 90% secondary fuel to total fuel). Conversely, since knock-free regimes of the engine cylinders may define a desirable range for the substitution ratio (e.g., such that the multi-fuel engine may meet or exceed an expected reliability and an expected useful life thereof), knock may be monitored as an indicator of the substitution ratio being outside of the desirable range. Accordingly, in one embodiment, a knock detection system may be employed to mitigate knock while maximizing the substitution ratio of the multi-fuel engine. The knock detection system may be communicably coupled to the multi-fuel engine via firmware, which may receive, interpret, and pass feedback indicative of a time, location, and severity of a knocking event from sensors of the multi-fuel engine to the knock detection system. Responsive to the feedback, the knock detection system may dynamically adjust the substitution ratio or actively alter other engine operating conditions such that knocking is minimized. The knock detection system may decrease the substitution ratio responsive to an increased knock rate, as well as increase the substitution ratio responsive to a decreased knock rate (where the knock rate may be defined in one embodiment as a ratio of a number of knock events over a duration of engine operation to a number of combustion cycles over the duration of engine operation).

A technical effect of the knock detection system dynamically adjusting the substitution ratio based on the knock rate is that the substitution ratio may be maintained at, or near, a maximal value even when knock events are being infrequently detected by the knock detection system (e.g., regardless of whether the knock rate is high or low). In this way, the knock detection system may extend a useful life of the engine by reducing or eliminating undesirable knock events while simultaneously decreasing fueling costs by maximizing the substitution ratio (e.g., to minimize combustion of a primary fuel, such as diesel fuel, relative to combustion of a cheaper, secondary fuel, such as natural gas).

An additional technical effect of relying on the knock rate to dynamically adjust the substitution ratio is that the knock rate may depend on numerous engine operating conditions and ambient conditions, such that the adjusted substitution ratio may implicitly depend on the same engine operating conditions and ambient conditions. In this way, the substitution ratio may be maximized during high-power engine operation as well as in extreme ambient environments (e.g., high altitudes, extreme temperatures, etc.) via monitoring of a single correlated condition.

Embodiments of the knock detection system provided herein may determine adjustments to the substitution ratio in a statistical fashion. Specifically, a statistical knock rate control feedback loop may be included in the knock detection system for basing increases or decreases to the substitution ratio on a detected knock rate (e.g., a number of knock events over a number of combustion cycles). Within a space defined by the knock rate, a deadband (e.g., a subspace of knock rates for which no adjustments may be commanded for the substitution ratio) may be dynamically updated on the basis of a periodically refined confidence interval. Further, in some embodiments, the adjustments to the substitution ratio may be stored as reference values for a specific state in which the multi-fuel engine is operating. The combined technical effect of defining the deadband and updating the reference values for specific engine operating states is that only statistically significant knocking trends which stray outside of the deadband over time may be considered in adjusting base engine operating conditions, thereby mitigating knock adaptively, consistently, and accurately over a life of the multi-fuel engine.

Embodiments of the knock detection system provided herein may further integrate reactive knock mitigation strategies such that severe knock may be actively avoided even while reducing mild or moderate knock events by maintaining the substitution ratio within an acceptable range. In one embodiment, a reactive knock mitigation feedback loop for preventing severe knock in the short term (e.g., resulting from "runaway" pressure ramping) may be executed simultaneously with the statistical knock rate control feedback loop for preventing mild and moderate knock in the long term (e.g., resulting from less than desirable substitution ratios). Once detected, knock events may be obviated either by quick, relatively drastic alterations to engine operation, or smaller, dynamic adjustments to the substitution ratio after determination of statistically significant knock rates above or below expected values (e.g., above or below the deadband). In this way, the knock detection system may mitigate engine degradation in the vehicle system via a tailored, severity-based response to detected knock.

FIG. 1 shows an embodiment of a system in which a knock detection system may be installed. Specifically, FIG. 1 shows a block diagram of an embodiment of a vehicle system 100, herein depicted as a rail vehicle 106 (e.g., locomotive) configured to run on a rail 102 via a plurality of wheels 112. As depicted, the rail vehicle may include an engine 104. The engine may include a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine. In other non-limiting embodiments, the engine may be in a stationary platform. Other suitable vehicles may include a marine vessel, mining or industrial equipment, on-road vehicles, and off-highway vehicle propulsion systems.

The engine may receive intake air for combustion from an intake passage 114. The intake passage may include an air filter 160 that filters air from outside of the rail vehicle. Exhaust gas resulting from combustion in the engine may be supplied to an exhaust passage 116. Exhaust gas may flow through the exhaust passage, and out of an exhaust stack of the rail vehicle. The exhaust passage may include an exhaust gas sensor 162, which may monitor a temperature and/or an air-fuel ratio of the exhaust gas, and which may be coupled to the controller to provide monitoring data thereto.

In one example, the engine may be a (single fuel) diesel engine that combusts air and diesel fuel through compression ignition. In another example, the engine 104 may be a dual or multi-fuel engine that may combust a mixture of gaseous fuel and air upon injection of diesel fuel during compression of the air-gaseous fuel mixture. In other non-limiting embodiments, the engine may additionally combust fuel including gasoline, hydrogen, ammonia, alcohol such as ethanol (EtOH) and/or methanol, kerosene, natural gas, biodiesel, or other petroleum distillates of similar density through compression ignition (and/or spark ignition).

In one embodiment, the rail vehicle may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (battery), fuel cells, hydrogen engines, and the like. While diesel is discussed as an example fuel, other fuels may be used. Suitable other fuels may include gasoline, kerosene, ethanol, methanol, dimethyl ether (DME), biodiesel, natural gas, and combinations of the foregoing.

As depicted in FIG. 1, the engine may be coupled to an electric power generation system, which includes an alternator/generator 122 and a plurality of electric traction motors 124. For example, the engine may be a diesel and/or natural gas engine that generates a torque output which may be transmitted to the alternator/generator, the alternator/generator being mechanically coupled to the engine. In one embodiment herein, and as discussed in detail below with reference to FIG. 2, the engine may be a multi-fuel engine operating with diesel fuel and natural gas, but in other examples the multi-fuel engine may use various combinations of fuels other than diesel and natural gas.

Electrical power produced by the alternator/generator may be stored and applied for subsequent propagation to a variety of downstream electrical components. As an example, the alternator/generator may be electrically coupled to the plurality of electric traction motors and the alternator/generator may provide electrical power to the plurality of electric traction motors. As depicted, each of the plurality of electric traction motors may be coupled to one of the plurality of wheels to provide tractive power to propel the rail vehicle. One example configuration may include one electric traction motor per wheel set (e.g., a subset of the plurality of wheels). As depicted herein, six electric traction motors may respectively correspond to six pairs of motive wheels of the rail vehicle. In another example, the alternator/generator may be coupled to one or more resistive grids 126. The resistive grids 126 may dissipate excess engine torque via heat produced by the grids from electricity generated by the alternator/generator. Additionally or alternatively, the resistive grids may be used in a dynamic braking mode to dissipate electricity generated by the electric traction motors.

In some embodiments, the vehicle system may include a turbocharger 120 arranged between the intake passage and the exhaust passage. The turbocharger may increase air charge of ambient air drawn into the intake passage in order to provide greater charge density during combustion to increase power output and/or engine-operating efficiency. The turbocharger may include at least one compressor (not shown) which may be at least partially driven by at least one corresponding turbine (not shown). In some embodiments, the vehicle system may include an aftertreatment system coupled in the exhaust passage upstream and/or downstream of the turbocharger. In one embodiment, the aftertreatment system may include a diesel oxidation catalyst (DOC) and/or a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other filters or devices or exhaust aftertreatment systems.

As depicted in FIG. 1, the vehicle system 100 may include a cooling system 150 (e.g., engine cooling system). The cooling system may circulate coolant (e.g., water, glycol, etc.) through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the rail vehicle is moving slowly or stopped while the engine is running. In some examples, a speed of the fan may be controlled by the controller. Coolant which is cooled by the radiator may enter a tank (not shown), whereafter the coolant may be pumped by a water, or coolant, pump 156 back to the engine or to another component of the vehicle system.

The controller may control various components related to the rail vehicle. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the rail vehicle (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or rail vehicle, may receive signals from a variety of engine sensors, as further elaborated herein, in order to determine operating parameters and operating conditions, and correspondingly adjust various engine actuators to control operation of the engine and/or rail vehicle. For example, the controller may receive signals from various engine sensors including, but not limited to, engine speed, engine load, intake manifold air pressure, boost pressure, exhaust pressure, ambient pressure, ambient temperature, exhaust gas temperature, exhaust gas air-fuel ratio, particulate filter temperature, particulate filter backpressure, engine coolant pressure, or the like. Additional sensors, such as coolant temperature sensors, may be positioned in the cooling system. Correspondingly, the controller may control the engine and/or the rail vehicle by sending commands to various components such as the plurality of electric traction motors, the alternator/generator, the fuel injectors, valves (e.g., a coolant valve), the coolant pump, or the like. For example, the controller may control the operation of a restrictive element (e.g., such as a valve) in the engine cooling system. Other actuators controllable by the controller may be coupled to various locations in the rail vehicle.

In one embodiment, the controller may include a knock detection application 172, the knock detection application consisting of executable instructions stored in the memory of the controller. The knock detection application may be operable to detect or estimate knock occurring in at least one of the plurality of cylinders. The knock may be detected on a per cylinder basis, on a per cylinder group basis, or based on the plurality of cylinders as a whole. In addition to detecting knock, the knock detection application may dynamically adjust a substitution ratio of the at least one of the plurality of cylinders based on a frequency of knock events (e.g., a knock rate determined from a number of detected knock events over a number of combustion cycles). The substitution ratio may similarly be adjusted on a per cylinder basis, on a per cylinder group basis, or based on the plurality of cylinders as a whole. A feedback loop may be implemented, allowing substantially continuous updating of the substitution ratio responsive to substantially continuous monitoring for and detecting of knock events ("substantially" may be used herein as a qualifier meaning "effectively" or "practically").

Specifically, the knock detection application may be included in a knock detection system 170, the knock detection system further including one or more sensors 174 and one or more actuators 176 communicably coupled to the knock detection application. The knock detection application may receive signals (e.g., in the form of vibrational or audible feedback, pressure readings, etc.) from the one or more sensors indicative of an individual knocking event in the at least one of the plurality of cylinders. Depending on a configuration of the one or more sensors, the signals may indicate further aspects of the individual knocking event, such as one or more of a severity or magnitude of the individual knocking event, a number of knocking cylinders, and a relative location of such knocking cylinder(s) (e.g., a specific one or more of the cylinders may be indicative of particularly problematic knocking). Accordingly, the one or more sensors may include sensors operable to send binary or otherwise discrete signals (e.g., indicative of knocking or no knocking) and/or sensors operable to send substantially continuous signals (e.g., indicative of the severity of the knocking). In one example, the severity of the knocking may be determined based on whether a threshold number of the one or more sensors send signals (discrete or otherwise) indicative of the knocking (e.g., the knocking may be indicated to be less severe if relatively few or only one of the one or more sensors send signals indicative of the knocking). In some examples, the one or more sensors may additionally send signals indicative of one or more engine operating conditions upon which the substitution ratio depends or vice versa, such as an engine speed, an engine torque, a manifold air temperature (MAT), etc.

The knock detection application may receive the signals from the one or more sensors, in addition to parameters stored in the memory (e.g., from look-up tables, functions, maps, etc.) corresponding to a specific operating state of the engine. For example, the specific operating state may be defined by a throttle level (e.g., corresponding to a set of known engine operating conditions requested for a desired engine power). Additionally or alternatively, the definition of the specific operating state may be refined by an indication of full or limited range of substitution ratio values. For example, a specific operating state commanding the full range of substitution ratio may permit adjustments of the substitution ratio up to a value of 0.95, whereas a specific operating state commanding the limited range of substitution ratio values may permit adjustments of the substitution ratio up to a value of 0.6. In one embodiment, selection of the full or limited range of substitution ratio values may be based on whether higher substitution ratios would potentially degrade engine components (or are otherwise undesirable). For example, the limited range of substitution ratio values may be requested responsive to extreme ambient conditions (e.g., when ambient temperature is relatively high, when altitude is relatively high, etc.), hardware degradation (e.g., when one or more sensors are not functional), an inability of the vehicle system to maintain a requested (higher) substitution ratio, and/or an altered quality of the gaseous fuel. In some embodiments, more than two substitution ratio ranges may be implemented (e.g., one range selected responsive to standard ambient conditions, one range selected responsive to extreme heat, one range selected responsive to extreme altitude, etc.).

Upon receipt from the one or more sensors, the signals may be processed to determine a presence and/or severity of a given knocking event, from which a knock rate may be determined over a plurality of combustion events (e.g., a rate of knocking per combustion cycle). Additionally or alternatively, the signals may be processed to determine other engine operating conditions upon which the substitution ratio depends (such as the MAT). Based on the knock rate, in addition to the parameters, the knock detection application may further determine whether to increase the substitution ratio, decrease the substitution ratio, or maintain the substitution ratio. In some examples, following or in tandem with the determination of substitution ratio adjustment, the substitution ratio may be further refined by the other determined engine operating conditions (e.g., the MAT).

Based on any determined adjustment to the substitution ratio, the knock detection application may command the one or more actuators to adjust fueling to the at least one of the plurality of cylinders. Accordingly, the one or more actuators may include valves controlling fuel flow to the fuel injectors or firmware communicably coupled to such valves. Responsive to any determined adjustment to the substitution ratio, the controller may further command the one or more actuators to maintain the engine speed within a threshold range. In one example, reducing the substitution ratio of a given cylinder or cylinder group may reduce knocking of the given cylinder or cylinder group.

In some embodiments, the engine may be a dual fuel engine combusting a secondary fuel (e.g., natural gas) and a primary fuel (e.g., diesel fuel) according to the substitution ratio. As such, the substitution ratio for a given cylinder may relate combustion of the secondary fuel to combustion of total fuel (e.g., the sum total of the primary fuel and the secondary fuel) for the given cylinder. As an example, the substitution ratio may be defined as a ratio of an amount of secondary fuel delivered to the given cylinder for combustion relative to an amount of the total fuel delivered to the given cylinder for combustion. As another example, the substitution ratio may be defined as a ratio of the secondary fuel contribution to gross indicated torque to total gross indicated torque (e.g., derived from both the primary and secondary fuels).

As discussed above, the substitution ratio may be varied independently for each cylinder of the plurality of cylinders or a subset (e.g., group) thereof. In additional or alternative embodiments, the plurality of cylinders may be considered as one or more groups of cylinders, where each cylinder in a given cylinder group may have a same substitution ratio. For example, the plurality of cylinders may be divided into a first cylinder group and a second cylinder group fueled according to a first substitution ratio and a second substitution ratio, respectively. However, in alternative embodiments, the plurality of cylinders may be divided into more than two groups, such as three groups, where each group receives the primary and secondary fuels at a different substitution ratio. For example, the number of groups of cylinders receiving different substitution ratios may be any number between one and a number of cylinders included in the plurality of cylinders. At some times during engine operation, all of the plurality of cylinders may be included in a first group of cylinders. For example, at start-up of the engine, all of the plurality of cylinders may be included in the first group of cylinders and then, in response to knock being detected in at least one of the plurality of cylinders, the at least one cylinder experiencing knock may be moved from the first group of cylinders into the second group of cylinders. In additional or alternative embodiments, one cylinder or group of cylinders of the plurality of cylinders may be more prone to knock than remaining cylinders of the plurality of cylinders. In such embodiments, the substitution ratio of only the knock-prone cylinder or cylinder group may be adjusted. Alternatively, knocking of the knock-prone cylinder or cylinder group may be inferred by the controller as indicative of knocking in remaining cylinders of the plurality of cylinders, and mitigating action (e.g., decreasing the substitution ratio) may be undertaken for all cylinders of the plurality of cylinders.

Figure 2:
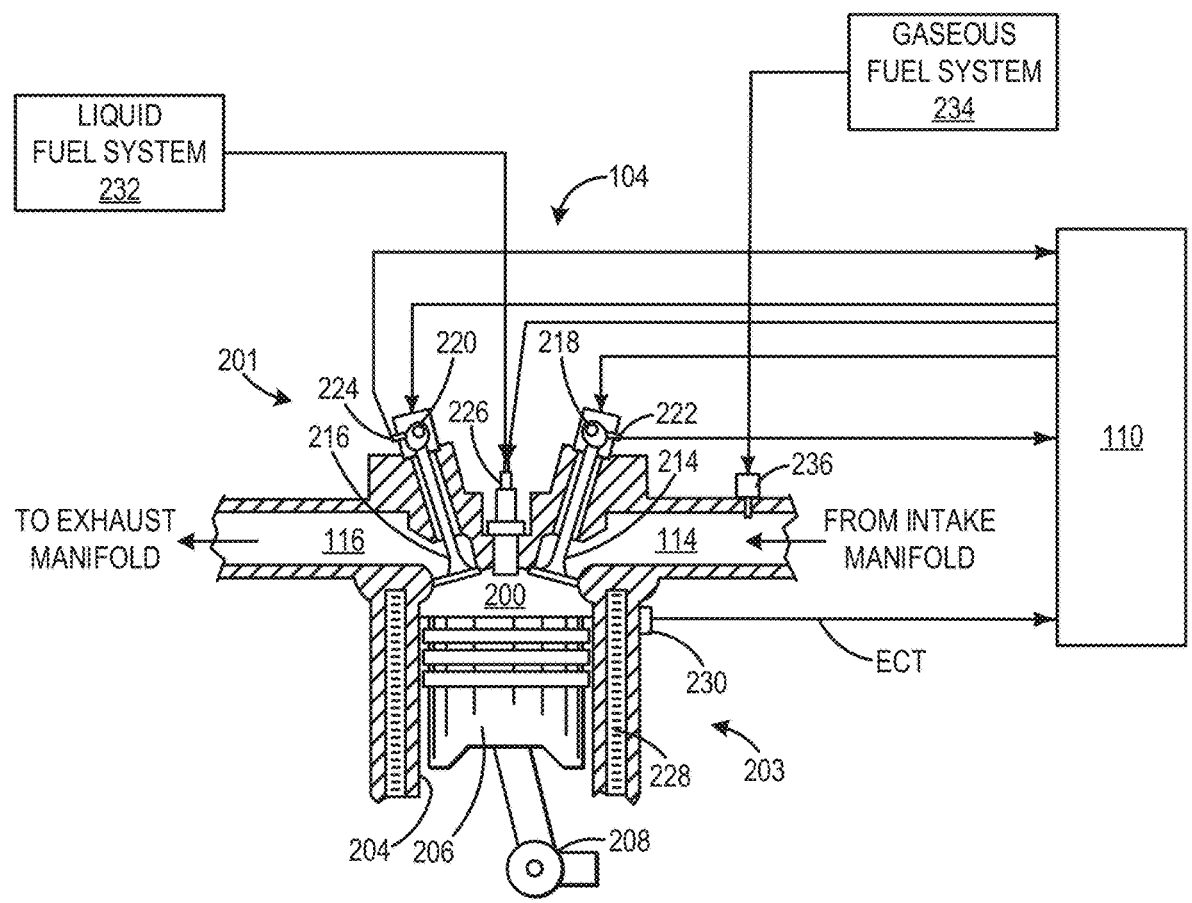
FIG. 2 shows a schematic diagram of an example cylinder of a multi-fuel engine, such as the engine of FIG. 1.
Figure 3:
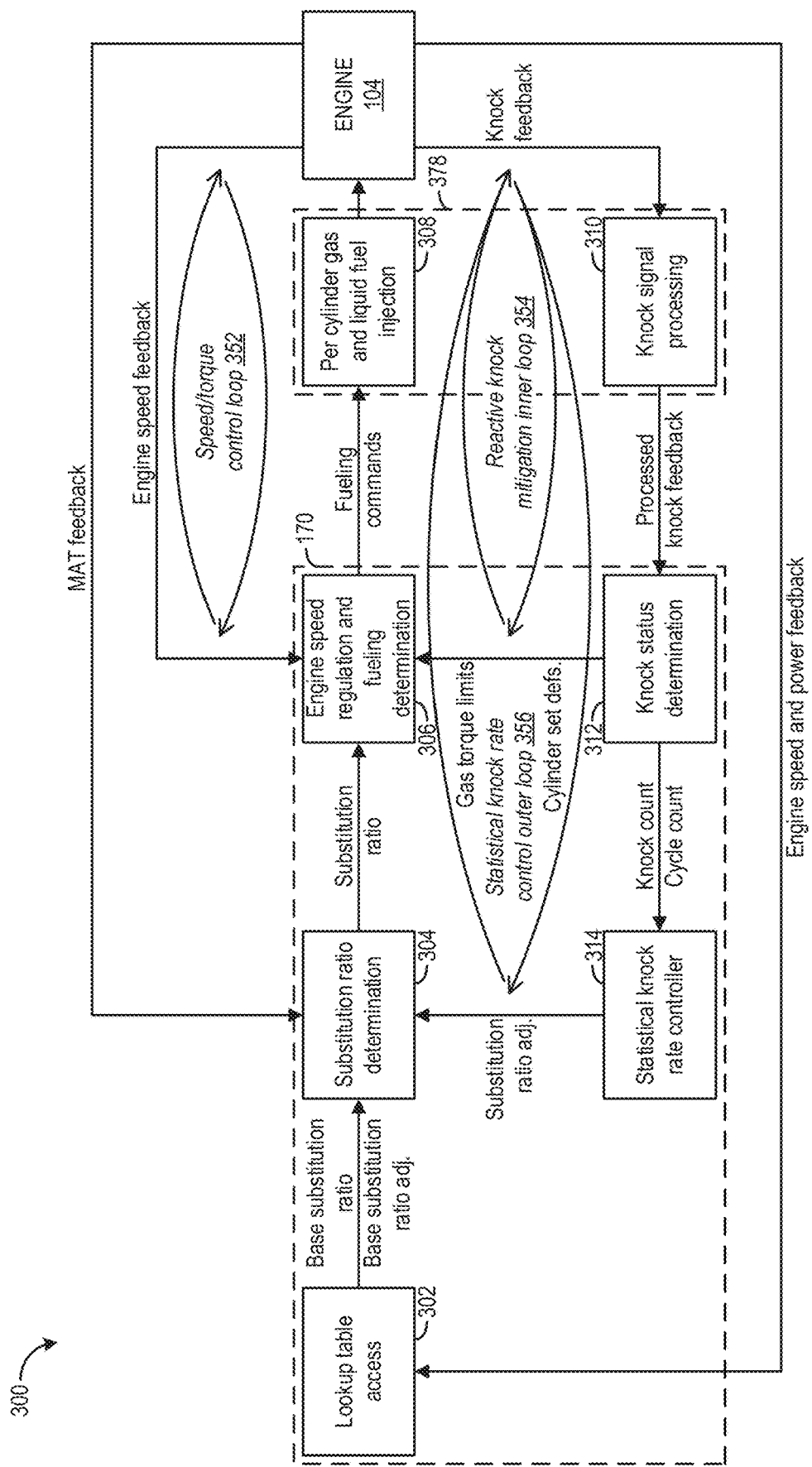
FIG. 3 shows a high-level block diagram of the exemplary knock detection system of FIG. 1 in a feedback loop with the engine of FIG. 1.

FIG. 2 depicts one such dual fuel engine which may be coupled to and at least partially controlled by the knock detection system of FIG. 1. FIG. 3 depicts further operational aspects of the knock detection system, including feedback loops established by sending outputs to and receiving inputs from the engine. As discussed above, the knock detection system may include a knock detection application stored as executable instructions in non-transitory memory of a controller. Execution of the knock detection application at the controller is described with reference to the flow charts of FIGS. 4-6. Specifically, and as further discussed above, the knock detection application may adjust a substitution ratio of the dual fuel engine responsive to a knock rate determined to be statistically significant. FIG. 7 depicts an exemplary plot by which such adjustments to the substitution ratio may be derived.

Referring now to FIG. 2, an embodiment of a combustion chamber, or cylinder 200, of a multi-cylinder internal combustion engine, such as the engine 104 described in detail above with reference to FIG. 1, is depicted. For example, the cylinder may be any one of the plurality of cylinders 101 shown in FIG. 1. The cylinder may be defined by a cylinder head 201, housing intake and exhaust valves and a liquid fuel injector, described below, and a cylinder block 203.

The engine may be controlled at least partially by a control system including a controller, such as the controller 110 described in detail above with reference of FIG. 1. Accordingly, the controller may be included within a vehicle system, such as the vehicle system 100 described in detail above with reference to FIG. 1, and communicably coupled to components thereof. As described above, the controller may receive signals from various engine sensors including, but not limited to, the engine speed, the engine load, a boost pressure, an exhaust pressure, a turbocharger speed, an ambient pressure, $CO_2$ levels, an exhaust temperature, NOx emission, an engine coolant temperature (ECT) from a temperature sensor 230 coupled to a cooling sleeve 228, knock sensor data, etc. Correspondingly, the controller may control the vehicle system by sending commands to various components thereof, such as the alternator/generator, cylinder valves, a throttle, fuel injectors, etc.

The cylinder (e.g., combustion chamber) may include a cylinder liner 204 with a piston 206 positioned therein. The piston may be coupled to a crankshaft 208 so that reciprocating motion of the piston may be translated through a connecting rod into rotational motion of the crankshaft. The crankshaft may include a crankshaft speed sensor (not shown) for outputting a speed (e.g., instantaneous speed) of the crankshaft. In some embodiments, the engine may be a four-stroke engine in which each of the cylinders may fire in a firing order during two revolutions of the crankshaft. In other embodiments, the engine may be a two-stroke engine in which each of the cylinders may fire in a firing order during one revolution of the crankshaft.

The cylinder may receive intake air for combustion from an intake including an intake passage, such as the intake passage 114 described in detail above with reference to FIG. 1. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine may be supplied to the exhaust including an exhaust passage, such as the exhaust passage 116 described in detail above with reference to FIG. 1. Exhaust gas flows through the exhaust passage, to the turbocharger in some embodiments (not shown in FIG. 2) and to atmosphere, via an exhaust manifold. The exhaust passage may further receive exhaust gases from other cylinders of the engine in addition to the cylinder shown, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder shown, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The positions of the intake and exhaust valves may be determined by respective valve position sensors 222 and 224, and/or by cam position sensors. The valve actuators may be of electric valve actuation type or cam actuation type, or a combination thereof, for example.

The intake and exhaust valve timing may be controlled concurrently or any of a possibility of variable intake cam timing, variable exhaust cam timing, dual independent variable cam timing, or fixed cam timing may be used. In other embodiments, the intake and exhaust valves may be controlled by a common valve actuator or actuation system, or a variable valve timing actuator or actuation system. Further, the intake and exhaust valves may be controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This may also extend to the exhaust, although in some examples exhaust valves may still be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion chamber. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on a commanded substitution ratio.

Further, each cylinder of the engine may receive gaseous fuel (e.g., natural gas) alternative to or in addition to liquid fuel. Suitable liquid fuels may include one or more of diesel, gasoline, kerosene, ethanol, methanol, DME, or another liquid fuel type. Suitable gaseous fuels may include one or more of compressed natural gas, liquefied natural gas, ammonia, syngas, hydrogen, ethanol, methanol, DME, or another gaseous fuel type. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc. located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as a gas admission valve 236, may supply gaseous fuel from the gaseous fuel system to each respective cylinder via respective intake passages. For example, opening time (in engine crank position or in engine crank degree) and/or duration of opening of the gas admission valve may be adjusted to regulate an amount of gaseous fuel provided to the cylinder. Adjusting the opening timing (e.g., when the gas admission valve is opened and closed) may be referred to herein as adjusting induction timing of gaseous fuel. As one example, the duration of gas admission valve (or gas valve) opening is defined by the engine crank degrees corresponding to opening and closing of the gas admission valve. Each respective cylinder may be provided with gaseous fuel from an individual gas admission valve, allowing for individual cylinder control in the amount of gaseous fuel provided to the cylinders. In another embodiment, gaseous fuel from the gaseous fuel system may be directly injected into the plurality of cylinders. For example, each cylinder may include a direct fuel injector or gas admission valve (similar to the gas admission valve shown) coupled directly to the cylinder. In this way, both liquid (e.g., diesel) and gaseous fuels may be directly injected into individual cylinders (e.g., such as in a high-pressure "dual-fuel" direct injection system). Additionally, in one embodiment, each cylinder may include a spark plug for igniting fuel, such as natural gas, at the cylinder. In another embodiment, each cylinder may include an alternate ignition device (other than a spark plug) for igniting fuel at the cylinder, such as a laser or an alternate ignition source.

As introduced above, each cylinder of the plurality of cylinders may have a dedicated knock sensor. As such, the controller may receive a knock sensor output (e.g., signal) for each of the plurality of cylinders. The controller may then determine a knock level for each individual cylinder based on the corresponding knock sensor output and determine whether each individual cylinder is experiencing knock by comparing the knock level (or a raw knock sensor output or signal, such as a voltage) to a threshold knock level (or threshold knock sensor output, such as a threshold voltage) that is indicative of cylinder knock. For example, in response to the knock output of an individual cylinder knock sensor being above a set threshold knock output or level (which may be stored in the non-transitory memory of the controller), the controller may determine the cylinder to which the knock sensor is coupled is knocking. The controller may also determine a gas torque limit for each cylinder, based on the knock sensor output of the cylinder (or based on a knock magnitude for the cylinder). The gas torque limit may be the maximum amount of gas fuel torque (e.g., energy) that may be produced by the cylinder (from combusting fuel at the cylinder) for the current knock level/magnitude (e.g., so that knocking does not get worse). A corresponding substitution ratio of gas torque to total fuel torque may then be determined. Fueling (gaseous and diesel) amounts may be commanded according to the determined substitution ratio in order to produce the desired levels of gas torque and diesel torque.

Referring now to FIG. 3, a flow diagram 300 of a knock detection system, such as the knock detection system 170 of FIG. 1, communicably coupled to an engine, such as the engine 104 of FIGS. 1 and 2, is shown. As such, in one embodiment, the engine may be a dual fuel engine which may combust mixtures of natural gas and diesel fuel according to determined substitution ratios on a per cylinder basis. The substitution ratios (which may be different for each individual cylinder, or may be the same across individual groups of cylinders or all of the plurality of cylinders) may be determined for a given operating state of the engine and responsive to a detected knock rate. A plurality of feedback loops or operating modes, discussed in further detail below, may manage such dynamic updates to the substitution ratio on both slow and fast timescales (e.g., depending a severity or magnitude of detected knock or a magnitude of the detected knock rate).

The knock detection system may include a knock detection application, such as the knock detection application 172 of FIG. 1, stored as executable instructions on non-transitory memory of a controller of a vehicle system. As shown, the knock detection system may be communicably coupled to one or more firmware devices 378. The knock detection application may pass outputs to the one or more firmware devices and may receive inputs therefrom. The one or more firmware devices may further be communicably coupled to the engine (and/or sensors coupled to the engine), such that at least some of the inputs to the knock detection application may be processed by applications and other executable instructions stored in non-transitory memory of the one or more firmware devices. The knock detection application may also receive inputs directly from the engine or sensors coupled thereto.

At 302, one or more lookup tables, functions, or maps may be accessed in accordance with a specific engine operating state. In one embodiment, the specific engine operating state may include a throttle level requested by a vehicle operator. The throttle level may be inferred by the knock detection application based on engine speed and engine power feedback received from the engine. In some vehicles, such as rail vehicles, the throttle level may be one of a discrete set of determined throttle levels referred to as "notches." In one embodiment, a "notch" may correspond to a set of base engine operating conditions, such as a distinct speed and load setpoint.

In some embodiments, a base substitution ratio and one or more base substitution ratio adjustment values may be retrieved from the one or more lookup tables, functions, or maps. As an example, the one or more base substitution ratio adjustment values may include upper and/or lower limits of the substitution ratio for the specific engine operating state. As an additional or alternative example, the one or more base substitution ratio adjustment values may include a base MAT substitution ratio adjustment value which may restrict the upper limit of the substitution ratio based on the MAT.

The base substitution ratio and the one or more base substitution ratio adjustment values may be passed from 302 to 304, where a reference substitution ratio may be determined. The reference substitution ratio may be a function of the base substitution ratio, the one or more base substitution ratio adjustment values retrieved from the lookup table, and, as discussed in further detail below, a knock rate substitution ratio adjustment value determined based on the detected knock rate. Once determined, the reference substitution ratio for the specific engine operating state may be stored in memory of the controller to maintain consistent and optimized operation of the specific engine operating state. In some embodiments, the reference substitution ratio may be dynamically updated based on changes to engine operating conditions (e.g., the MAT, the detected knock rate), such that the reference substitution ratio stored in memory of the controller for the specific engine operating state may be a most recently determined reference substitution ratio (e.g., relative to a previously determined reference substitution ratio for the specific engine operating state). Accordingly, even during transient departures from the specific engine operating state or during periods of engine shutoff, the most recently determined reference substitution ratio may be retained as the reference substitution ratio for the specific engine operating state upon reentering the specific engine operating state. Unless otherwise specified herein, "substitution ratio" may refer to the reference substitution ratio for a given engine operating state.

In one embodiment, the substitution ratio may be determined as the minimum of the upper limit of the substitution ratio for the specific engine operating state and the base substitution ratio adjusted by the base MAT substitution ratio adjustment value and the knock rate substitution adjustment value (assuming the base substitution ratio corresponds to a positive value following adjustment; otherwise, the base substitution ratio may be set at zero). In some embodiments, each of the base MAT substitution ratio adjustment value and the knock rate substitution adjustment value may be dynamically updated based on current engine operating conditions. For example, at 304, MAT feedback may be received from the engine, from which the base MAT substitution ratio adjustment value may be updated in real time. The knock rate substitution ratio adjustment value may be similarly adjusted according to knock feedback received from the engine.

The determined substitution ratio for the specific operating state may be passed from 304 to 306, where a fueling request may be generated. In some embodiments, the fueling request may specify the substitution ratio on a per cylinder basis. Accordingly, in such embodiments, each of the base and reference substitution ratios may be an array of cylinder-specific substitution ratios. In some examples, at least some of the cylinder-specific substitution ratios may be the same. For instance, in examples where the plurality of cylinders is divided into a plurality of cylinder groups according to a plurality of cylinder set definitions, the cylinder-specific substitution ratios may be the same for each cylinder in a given group of cylinders, each group of cylinders corresponding to a different substitution ratio. In other examples, each cylinder in the plurality of cylinders may have the same substitution ratio (e.g., the substitution ratio may be determined as an average over the plurality of cylinders). Alternatively, each cylinder in the plurality of cylinders may have a different substitution ratio.

The cylinder-specific substitution ratios may further depend upon whether a full or limited substitution ratio range is requested, the limited substitution ratio range being narrower than the full substitution ratio range. As an example, the full substitution ratio range may permit dynamic adjustments of the substitution ratio of each cylinder in the plurality of cylinders up to an absolute magnitude of 0.95, while the limited substitution ratio range may permit dynamic adjustments of the substitution ratio of each cylinder in a portion of the plurality of cylinders up to an absolute magnitude of 0.6.

The fueling request may further be refined based on engine speed feedback received from the engine in real time. Specifically, the fueling request may be dynamically generated to maintain the engine speed corresponding to the specific engine operating state. Accordingly, for a given combustion cycle and specific engine operating state, a substitution ratio requested for a given cylinder may vary within a threshold range from the reference substitution ratio responsive to current engine operating conditions.

The fueling request may be passed from 306 to 308 as a plurality of fueling commands indicative of amounts, timings, and durations for fuel injection for each of the primary (e.g., liquid) and secondary (e.g., gaseous) fuels based on the substitution ratio for each cylinder. At the engine, the fuel injection may be executed by a plurality of actuators (e.g., valves, injectors, etc.; see FIGS. 1 and 2) in accordance with the plurality of fueling commands.

The knock detection system may dynamically interact with the engine via a plurality of feedback loops or operating modes being executed in tandem. For example, regulation of the engine speed may be executed via a speed/torque control loop 352, where the speed/torque control loop may maintain the engine speed responsive to a requested engine load by targeting an engine speed mapping of the specific engine operating state (e.g., the requested engine load may be treated as a disturbance to steady-state engine operation). Specifically, the speed/torque control loop may leverage a closed loop proportional-integral-derivative (PID) controller outputting a total gross indicated torque demand for adjusting the engine speed closer to the engine speed mapping. The speed/torque control loop may pass outputs between 306, 308, and the engine such that engine operating conditions (e.g., the engine speed) may be maintained at, or near, expected values for the specific engine operating state. As one example, the total gross indicated torque demand may be distributed among the primary and secondary fuels according to the substitution ratio received at 306. As discussed in detail above, responsive to receiving a fueling request, fueling of the engine may commence on a per cylinder basis (e.g., according to the substitution ratio for each cylinder). Outputs indicative of the engine speed may then be passed back, whereby the fueling request may be updated accordingly (e.g., to bring the engine speed closer to expected values). Operation of the engine may then be adjusted based on the updated fueling request.

The plurality of feedback loops may further include a reactive knock mitigation loop 354 and a statistical knock rate control loop 356. As shown, the reactive knock mitigation loop may be considered an inner loop relative to the statistical knock rate control (outer) loop, as at least a portion of the actions executed according to the reactive knock mitigation loop may also be executed according to the statistical knock rate control loop. One key difference between the inner and outer loops, however, may include how the substitution ratio is adjusted.

Specifically, both the reactive knock mitigation loop and the statistical knock rate control loop may include the engine passing knock feedback (e.g., as signals output by one or more knock sensors) to 310, where the knock feedback may be processed. The knock feedback may be indicative of one or more knocking parameters, such as an occurrence of knock within the engine or within a given cylinder of the engine, a severity of the knock, a number of knocking cylinders, etc. Processing of the knock feedback may include backing out of the one or more knocking parameters, from which a knock status of the engine may be determined at 312.

The knock status may include the severity of the knock (e.g., as a function of one or more of the number of knocking cylinders, whether or not one or more knock-prone cylinders are knocking, a magnitude of a specific knock event, etc.), based on which the reactive knock mitigation and statistical knock rate control loops may diverge. Specifically, if the severity of the knock is greater than or equal to a threshold severity (and/or is predicted to reach the threshold severity within a threshold number of combustion cycles), the reactive knock mitigation loop may continue by actively and drastically adjusting the engine operating conditions (and thereby the substitution ratio) in real time. Since a determination of severe knock may be indicative of a "runaway" knocking scenario (potentially resulting in engine degradation), the knock detection application may command substantially immediate alterations to engine operation by adjustments to the fueling request being generated at 306. As an example, the knock detection application may command a decrease of a gas torque limit for each cylinder experiencing the severe knock, which may correspondingly result in the substitution ratio being lowered for the severely knocking cylinders.

As an additional or alternative example, and as introduced above, the plurality of cylinders may be divided into two groups (which may also be referred to as "bins"). A first group may be a reduced-knocking group where cylinders in the first group are either not experiencing knock or experiencing knock at lower (less severe) levels and a second group may be a knocking group where cylinders in the second group are or have recently experienced knock at higher (more severe) levels. The cylinders may be divided into the first and second groups based on their determined gas torque limits and corresponding substitution ratios and a set substitution ratio for the first group. Additionally or alternatively, by balancing considerations of engine performance and engine component degradation, one group of cylinders may be permitted to knock (e.g., for a relatively short duration or with mild severity).

As one embodiment, each of the cylinders in the first group may receive natural gas and diesel fuel for combustion in amounts that result in a first substitution ratio of natural gas torque to total gross indicated torque (e.g., such as 80% natural gas torque to total torque) and each of the cylinders in the second group may receive natural gas and diesel fuel for combustion in amounts that result in a second substitution ratio of natural gas torque to total gross indicated torque (e.g., such as 60% natural gas torque to total torque). Thus, the second substitution ratio may be lower than the first substitution ratio. The second substitution ratio may be set and adjusted to a level corresponding to the gas torque limit (based on the knock level) for the cylinder with the lowest gas torque limit (e.g., the cylinder with the highest knock magnitude and thus experiencing the most knock). In some examples, lowering the second substitution ratio may reduce knock in all cylinders in the second group. The first substitution ratio may also be set and adjusted to a level that maximizes the overall (e.g., average) substitution ratio of the engine (e.g., for all cylinders). Accordingly, the plurality of cylinders may be dynamically allocated into the first and second groups based on each cylinder's current knock-limited gas torque capability (e.g., the gas torque limit and corresponding substitution ratio). During different periods of engine operation, such as during an engine start and/or a period following the engine start, all engine cylinders may be in the first group. The makeup of the groups may be adjusted (e.g., by moving one or more cylinders from the first group to the second group or from the second group to the first group) based on individual cylinder knock outputs and corresponding gas torque limits and substitution ratios. In this way, at any one time, fuel may be delivered to each cylinder at amounts that correspond to one of two possible substitution ratios. The two substitution ratios at which the cylinders receive fuel may then be adjusted by the controller based on individual cylinder knock outputs. In this way, fueling to the cylinders may be controlled in groups, but also based on individual cylinder knock sensor data.

As another embodiment, the cylinders in the first group may be operated at a first ignition (e.g., spark ignition or diesel injection) timing (e.g., sparked via a spark plug coupled to the cylinder at the first spark ignition timing relative to a crankshaft angle during a combustion cycle of the cylinder or injected via a diesel fuel injector) and the cylinders in the second group may be operated at a second ignition timing. The first ignition timing may be a baseline or less retarded ignition timing and the second ignition timing may be a more retarded timing that reduces knock in the cylinders of the second group and is based on the gas torque limit of the cylinder with the highest knock level. In some embodiments, the engine may be a single fuel engine that uses spark plugs coupled with the cylinder to ignite and combust fuel within the cylinders or that uses diesel injection with compression ignition to combust fuel within the cylinders. Similarly to as described above, the makeup of the groups may be adjusted (e.g., by moving one or more cylinders from the first group to the second group or moving one or more cylinders from the second group to the first group) based on individual cylinder knock outputs. In this way, the controller may control knock, separately, for two different groups of cylinders, based on individual cylinder knock sensor outputs.

However accomplished, adjustments to the substitution ratio commanded via the reactive knock mitigation loop may be quick and drastic. Such quick, drastic adjustments may be sufficient to mitigate severe knock events in the short term, but may be less effective at maintaining cylinder reliability in the long term. Accordingly, if the severity of the knock is less than the threshold severity (and/or is not predicted to reach the threshold severity within the threshold number of combustion cycles), the statistical knock rate control loop may continue by incrementing, for a given cylinder, a combustion cycle count and, if a knock event is detected for the given cylinder, a knock count. The incremented combustion cycle and knock counts may be passed from 312 to 314, where the detected knock rate may be determined by a statistical knock rate controller module (the knock rate being determined as a most recently incremented knock count over a most recently incremented combustion cycle count).

Based on the detected knock rate, the statistical knock rate controller module may determine whether to increase, decrease, or make no adjustment to the reference substitution ratio for the specific engine operating state. Specifically, a "no action" deadband may be defined based upper and lower tolerance values for an acceptable knock rate, where no adjustment to the substitution ratio may be made responsive to the detected knock rate being determined within the deadband. A confidence interval may further be determined based on the upper and lower tolerance values, the confidence interval increasing in magnitude as the combustion cycle count increases. The confidence interval may cushion the upper and lower tolerance values such that only statistically significant deviations from the acceptable knock rate (e.g., outside of the confidence interval) may be considered grounds for substitution ratio adjustment. In some embodiments, the confidence interval may be determined according to a statistical model (e.g., one or more of a probabilistic model, a machine learning based model, an artificial intelligence model, etc.). In one embodiment, the confidence interval may be a binomial proportion confidence interval, such as a Wilson score interval or a Wald interval.

The deadband may further account for spuriously high knock rates determined over relatively few combustion cycles. For instance, if a knock event occurs during a first combustion cycle following initiation of the specific engine operating state, the detected knock rate will be 100%. However, the individual knock event may not necessarily correspond to statistically significant knocking, as a subsequent knock event may not occur until many subsequent combustion cycles have passed (such that a true knocking rate may in actuality be much lower than the detected knocking rate during initial combustion cycling for the specific engine operating state). As such, the deadband may be expanded beyond the confidence interval during such initial combustion cycling.

When the detected knock rate strays outside of the deadband, the knock rate substitution ratio adjustment value may be determined (which may correspond to a decrease in the substitution ratio for a knock rate rising above the deadband and an increase in the substitution ratio for a knock rate falling below the deadband) and the confidence interval may be recomputed. By adaptively determining the confidence interval with each substitution ratio adjustment in this way, statistical trends in knocking may be more consistently predicted over time for a given substitution ratio. Based on such consistent predictions, knock events may be mitigated even while maximizing the substitution ratio.

The knock rate substitution ratio adjustment value may be passed from 314 to 304, where the reference substitution ratio for the specific engine operating state may be adjusted and stored in memory of the controller, replacing a previously determined reference substitution ratio. In this way, the substitution ratio may be maximized for a given set of engine operating conditions based on the detected knock rate. Specifically, the substitution ratio may be dynamically adjusted over time in accordance with statistically significant knocking trends, such that fueling costs may be reduced and long-term engine reliability may be maintained via reduction in knocking at all severity levels (e.g., by cycling the reactive knock mitigation and statistical knock rate control loops in tandem).

As introduced above, embodiments of the knock detection system provided herein may be implemented as executable instructions in non-transitory memory of an engine controller (e.g., the controller 110 of FIGS. 1 and 2). For example, the instructions may be executed by the engine controller according to the flow charts depicted in FIGS. 4-6 in conjunction with signals received from sensors of a vehicle system (e.g., the vehicle system 100 of FIG. 1), such as knock sensors coupled to cylinders of an engine of the vehicle system (e.g., the engine 104 of FIGS. 1 and 2). Further, the engine controller may employ engine actuators of the vehicle system, such as valves, fuel injectors, etc., to adjust engine operation according to the methods as described in detail below with reference to FIGS. 4-6. The instructions for carrying out the methods and commands to engine actuators generated therefrom may be executed automatically by the engine controller and the vehicle system (following an operator command, at preset intervals, and/or under preset conditions). Further, though the methods are described below with reference to one cylinder, the methods may be applied in series or parallel to a plurality of similarly configured cylinders in the vehicle system (e.g., to a subset of all cylinders in the vehicle system or to all cylinders in the vehicle system).

Figure 4:
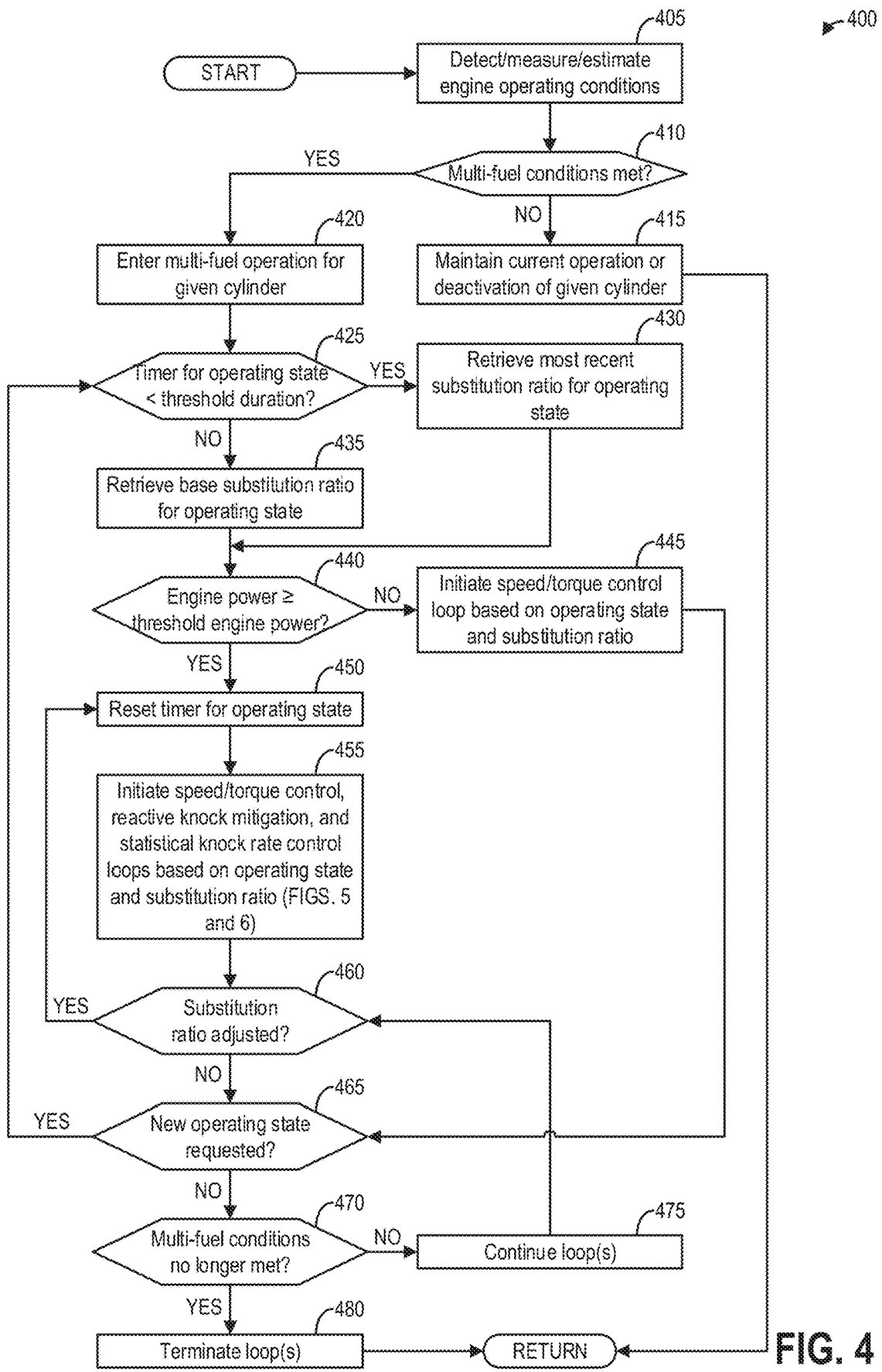
FIG. 4 shows a flow chart of a method for controlling fueling of an exemplary cylinder of the engine of FIG. 1.

Referring now to FIG. 4, a flow chart is depicted, showing a method 400 for controlling fueling of a cylinder of an engine in a specific engine operating state. The cylinder may be one of a plurality of cylinders configured for multi-fuel operation, such as one of the cylinders described in detail above with reference to FIGS. 1 and 2. For the specific engine operating state, a substitution ratio may be dynamically adjusted based on a severity of detected knocking via a plurality of feedback loops or operating modes, such as the reactive knock mitigation and statistical knock rate control loops described in detail above with reference to FIG. 3, enabled responsive to an engine power corresponding to the specific engine operating state being greater than or equal to a threshold engine power. Dynamic adjustments to the substitution ratio may be stored in non-transitory memory of an engine controller as reference values for the specific engine operating state. Accordingly, when the specific engine operating state is again requested following engine shutoff or a period at another engine operating state, a most recently refined substitution ratio may remain a part of a known set of engine operating conditions by which the engine operating state may be defined. In this way, a life of the engine may be increased while reducing fueling costs, as periodic updates to engine operating states may be calibrated to maximize the substitution ratio under a constraint of minimal knocking.

At step 405, the method may include detecting and/or estimating and/or measuring one or more engine operating conditions. As examples, the one or more engine operating conditions may include engine speed, engine load, engine temperature, ambient conditions (e.g., ambient temperature, pressure humidity, etc.), current operator torque demand, manifold pressure, manifold air flow, fuel temperature, exhaust gas air-fuel ratio, indication of knock (e.g., occurrence of a knock event, a relative location of the knock event, a number of cylinders experiencing knock, a severity or magnitude of the knock, etc.), substitution ratio, etc. The one or more engine operating conditions may be measured by one or more sensors communicatively coupled to the controller (e.g., the exhaust gas air-fuel ratio may be measured directly via the exhaust gas sensor 162) or may be inferred based on available data (e.g., the engine temperature may be estimated from an engine coolant temperature measured by an engine coolant temperature sensor).

In an exemplary embodiment, at least one of the one or more engine operating conditions may be regulated according to a throttle level requested by an operator of a vehicle (e.g., a rail vehicle) including the engine. Specifically, the throttle level may correspond to a set of known engine operating conditions requested for a desired engine power. In additional or alternative embodiments, at least one of the one or more engine operating conditions may be specific to the cylinder or to a cylinder group in which the cylinder is included. For example, the substitution ratio may be commanded at a set (e.g., reference) value for the cylinder or cylinder group. In some embodiments, subsequent adjustments to the substitution ratio may depend on whether a full or limited substitution ratio range is requested for the cylinder or cylinder group (the full adjustment range being broader than and inclusive of the limited adjustment range), which may also be determined at step 405 as one of the one or more engine operating conditions. Accordingly, adjustments to the substitution ratio of the cylinder or cylinder group may vary depending on which substitution ratio range is selected.

At step 410, the method may include determining whether one or more multi-fuel conditions have been met for the cylinder. In some embodiments, the one or more multi-fuel conditions may include the cylinder being activated. In additional or alternative embodiments, the one or more multi-fuel conditions may include receiving a request for multi-fuel operation of the cylinder. In certain embodiments, only a portion of the plurality of cylinders of the engine may be requested for multi-fuel operation during select, predefined engine operating conditions. In such embodiments, any remaining cylinders may be deactivated, configured for single fuel operation, or otherwise operate outside of standard multi-fuel operation (e.g., one or more cylinders may be selected for testing or calibration). If the one or more multi-fuel conditions have not been met for the cylinder (e.g., if the request has not been received for multi-fuel operation of the cylinder and/or if the cylinder is deactivated), the method may proceed to step 415, where the method may include maintaining a current operating state or deactivation of the cylinder. For example, the vehicle system may remain deactivated or may continue operating without interruption.

If the one or more multi-fuel conditions are met (e.g., if the request has been received for multi-fuel operation of the cylinder and/or if the cylinder is activated), the method may proceed to step 420, where the method may include entering multi-fuel operation for the cylinder. Specifically, the cylinder, being configured to receive both a primary (e.g., liquid) fuel and a secondary (e.g., gaseous) fuel, may be indicated at the engine controller to be in a multi-fuel mode. Upon the cylinder being indicated in the multi-fuel mode, the engine controller may perform a plurality of initializing actions prior to commanding fueling.

In an exemplary embodiment, the plurality of initializing actions may include selection of, and entry into, the specific engine operating state. Specifically, the specific engine operating state may be selected responsive to one or more of an operator request, ambient conditions (e.g., whether or not the engine is operating in relatively high ambient temperatures, whether or not the engine is operating at relatively high altitudes, etc.), the selected substitution ratio range, and whether or not the engine is in a transient operating state during a gradual throttling up to an operator-requested engine operating state (including, in some examples, whether or not the limited substitution ratio range is transiently requested for gradually adapting the engine to operating in the multi-fuel mode with the full substitution ratio range).

At step 425, the method may include determining whether a timer for the specific engine operating state has recorded less than a threshold duration. In some embodiments, whenever the specific engine operating state is requested, the timer may reset (see below). Accordingly, when the specific engine operating state has not been requested for a length of time (e.g., the threshold duration), determinations and assumptions made by the engine controller regarding knocking and the substitution ratio for the cylinder may no longer be valid (e.g., the engine may have undergone degradation over time, one or more components may have been replaced, etc.). Accordingly, if the timer for the specific engine operating state has recorded less than the duration, the method may proceed to step 430, where the method may include retrieving a most recently determined substitution ratio for the specific engine operating state. In some embodiments, the most recently determined substitution ratio may be a base substitution ratio, unadjusted for knocking and retrieved from one or more lookup tables, functions, or maps stored in memory of the engine controller. In other embodiments, the most recently determined substitution ratio may be adjusted for knocking during a previous combustion cycle corresponding to the same engine operating state. If the timer for the specific engine operating state has recorded greater than or equal to the threshold duration, the method may proceed to step 435, where the method may include retrieving the (unadjusted) base substitution ratio for the specific engine operating state (e.g., from the one or more lookup tables, functions or maps).

Whether or not the timer for the specific engine operating state has exceeded the threshold duration, at step 440, the method may include determining whether the engine power corresponding to the specific engine operating state is greater than or equal to a threshold engine power. In some embodiments, the engine power may be the desired engine power corresponding to the operator-requested throttle level and the threshold engine power may be an engine power corresponding to a threshold throttle level. In such embodiments, the operator-requested throttle level may be one of a sequential series of "notches," numbered according to a desired power. For example, a throttle control may include eight positions (e.g., throttle levels N1, . . . , N8), in addition to an idle position. Accordingly, in such embodiments, the threshold throttle level may correspond to one of the eight positions (e.g., throttle level N6).

More broadly, the determination at step 440 may be considered a determination of whether the cylinder is operating with sufficient power such that knock may cause significant degradation or knock conditions are occurring with significant frequency. Specifically, because engine operating states corresponding to lower engine powers may be initiated with lower peak cylinder pressures, even relatively severe knocking may increase the peak cylinder pressure at lower engine powers to less than a peak cylinder pressure during typical engine operation at engine operating states corresponding to higher engine powers. Accordingly, at lower engine powers, the substitution ratio may be increased such that the engine operates substantially according to single fuel operation. Further, in some embodiments, decreasing the substitution ratio at such lower engine powers may undesirably increase knocking, which contravenes assumptions of the reactive knock mitigation and statistical knock control feedback loops.

Accordingly, if the engine power corresponding to the specific engine operating state is less than the threshold engine power (e.g., if the operator-requested throttle level is throttle level N5 or below), the method may proceed to step 445, where the method may include initiating a speed/torque control feedback loop based on the specific engine operating state and the substitution ratio (e.g., the base substitution ratio or the most recently determined substitution ratio). Specifically, in an exemplary embodiment, the speed/torque control feedback loop may regulate the engine speed via a PID controller outputting adjustments to a total gross indicated torque demand for maintaining the engine speed according to the set of known operating conditions corresponding to the specific engine operating state. However, no knocking detection or adjustments determined therefrom may be executed by the engine controller at step 445.

If the engine power corresponding to the specific engine operating state is greater than or equal to the threshold engine power (e.g., if the operator-requested throttle level is throttle level N6 or above), the method may proceed to step 450, where the method may include resetting the timer for the specific engine operating state. Specifically, a timer for the specific engine operating state may be reset so that the engine controller may record a duration elapsed since the specific engine operating state was last requested (and thereby make the determination at step 425, for example). In some embodiments, a timer for the selected substitution ratio range may further be reset (e.g., corresponding to when the full or limited substitution ratio range was last requested).

At step 455, the method may include initiating the speed/torque control feedback loop, a reactive knock mitigation feedback loop (see FIG. 5 below), and a statistical knock rate control feedback loop (see FIG. 6 below) based on the specific engine operating state and the substitution ratio (e.g., the base substitution ratio or the most recently determined substitution ratio). Specifically, in addition to the speed/torque control feedback loop regulating the engine speed, the reactive knock mitigation and statistical knock rate control feedback loops may mitigate knock via adjustments to the substitution ratio.

The reactive knock mitigation feedback loop may, responsive to an indication of severe knocking in the cylinder (e.g., knocking greater than or equal to a threshold severity is occurring or predicted to occur within a threshold number of combustion cycles), actively and rapidly adjust engine operating conditions upon which the substitution ratio depends such that knocking may be mitigated at least in the short term. As an example, responsive to the indication of severe knocking, the reactive knock mitigation feedback loop may command a gas torque limit of the cylinder be lowered. As an additional or alternative example, responsive to the indication of severe knocking, the reactive knock mitigation feedback loop may command adjustments to cylinder set definitions (e.g., the cylinder may be moved from a first cylinder group to a second, knock-prone cylinder group). As a result, severe knocking may be responsively mitigated via the reactive knock mitigation feedback loop.

The statistical knock rate control feedback loop may, responsive to an indication of mild or moderate knocking in the cylinder (e.g., knocking less than the threshold severity is occurring or predicted to occur within a threshold number of combustion cycles), initialize or update a knock rate for the cylinder. If the knock rate is determined to be statistically outside of an expected range, the statistical knock rate control feedback loop may command an adjustment to a reference substitution ratio for the cylinder in the set of known engine operating conditions for the specific engine operating state such that knocking may be mitigated in the long term. Specifically, since the reference substitution ratio may be adjusted via the statistical knock rate control feedback loop, each subsequent combustion cycle for the specific engine operating state may accordingly execute adjusted baseline fueling for the cylinder (at least until the reference substitution ratio is adjusted again or the timer for the specific engine operating state exceeds the threshold duration). In the case where no knocking in the cylinder is determined, the statistical knock rate control feedback loop may nevertheless initialize or update the knock rate based on one combustion cycle having elapsed. In this way, the statistical knock rate control feedback loop may be executed as an alternative to the reactive knock mitigation feedback loop in cases of less severe or no knocking (e.g., where immediate degradation to the cylinder may not be expected and therefore longer timescales may be relied upon for adjustments to engine operation), such that mild or moderate knocking may be adaptively mitigated. Severe knocking may also be mitigated via the statistical knock rate control feedback loop, as chronic, long-term increases in knocking severity may be avoided.

At step 460, the method may include determining whether the (reference) substitution ratio was adjusted at step 455 (e.g., via the statistical knock rate control feedback loop). In some embodiments, each time the reference substitution ratio is adjusted for the specific engine operating state, a plurality of counters may be reset and the feedback loops may continue with the adjusted reference substitution ratio.

For example, if the reference substitution ratio is adjusted at step 455, the method may return to step 450, where the method may include resetting the timer for the specific engine operating state and/or the timer for the selected substitution ratio range, after which the method may proceed to step 455, where the method may include reinitiating the feedback loops. Additional counters are discussed in detail below with reference to FIG. 6.

If the substitution ratio was not adjusted at step 455, the method may proceed to step 465, where the method may include determining whether a new engine operating state is requested (e.g., by the operator of the rail vehicle). If the new engine operating state is requested, the method may return to step 425, where the method may include determining whether a timer for the new engine operating state has recorded less than the threshold duration, and the multi-fuel operation of the cylinder may be executed according to the new engine operating state.

If the new engine operating state is not requested, the method may proceed to step 470, where the method may include determining whether the one or more multi-fuel conditions are no longer met. If the one or more multi-fuel conditions are still met (e.g., if the one or more engine operating conditions are unaltered and no additional requests to exit multi-fuel operation are received), the method may proceed to step 475, where the method may include continuing the feedback loop(s). For example, if each of the speed/torque control, reactive knock mitigation, and statistical knock rate control feedback loops was initiated at step 450, then, at step 475, the method may include continuing all three loops. Accordingly, the method may return to step 460, where the method may include determining whether the (reference) substitution ratio was adjusted.

Alternatively, if the speed/torque control feedback loop alone was initiated at step 445, then, at step 475, the method may include continuing only the speed/torque control feedback loop. Accordingly, though the flow chart depicts the method returning to step 460, a determination of no adjustment being made to the (reference) substitution ratio may be made (as the statistical knock rate control feedback loop was not initiated) and the method may proceed directly to step 465, where the method may include determining whether a new engine operating state was requested.

If the one or more multi-fuel conditions are no longer met (e.g., if the cylinder is requested deactivated or the cylinder is requested to exit multi-fuel operation), the method may proceed to step 480, where the method may include terminating the feedback loop(s). The feedback loop(s) may remain inactive until the cylinder again enters multi-fuel operation. The method may return.

Figure 5:
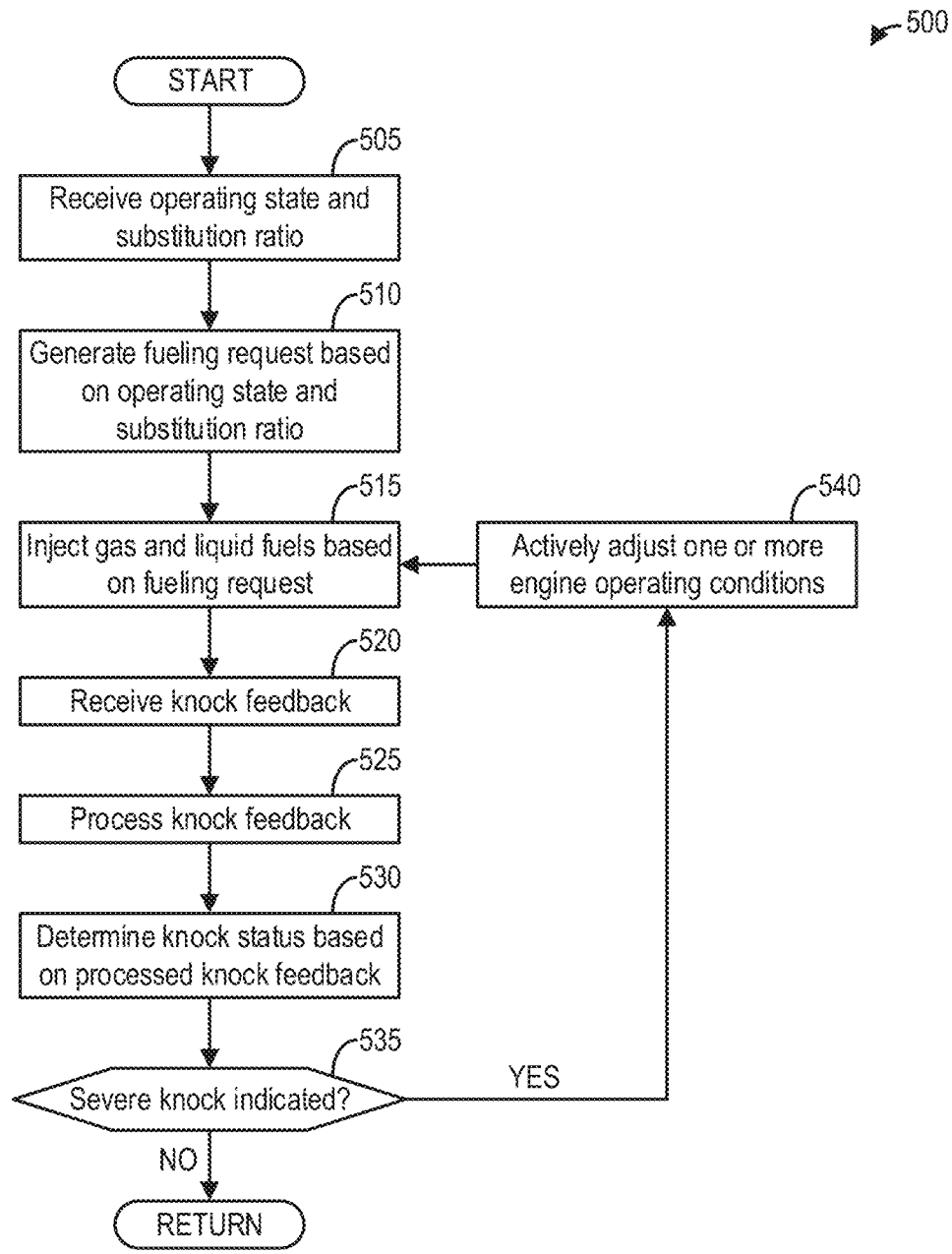
FIG. 5 shows a flow chart of a method for initiating a reactive knock mitigation loop for the exemplary cylinder.

Referring now to FIG. 5, a flow chart is depicted, showing a method 500 for initiating a reactive knock mitigation feedback loop for a cylinder of an engine in a specific engine operating state. The cylinder may be one of a plurality of cylinders configured for multi-fuel operation, such as one of the cylinders described in detail above with reference to FIGS. 1 and 2. The specific engine operating state may correspond to a set of known engine operating conditions stored in memory of the engine controller, which may include a base substitution ratio. However, the specific engine operating state may in actuality be executed based on the set of known engine operating conditions adjusted for one or more actual engine operating conditions. For example, the specific engine operating state may further correspond to a reference substitution ratio, the reference substitution ratio being based on, in one embodiment, the base substitution ratio adjusted according to one or more actual engine operating conditions. As further discussed in detail below, the reference substitution ratio may be based on the base substitution ratio adjusted to mitigate a detected knock. Additionally, when the detected knock is severe or is predicted to become severe within a relatively short duration, the reactive knock mitigation feedback loop may rapidly and drastically adjust one or more actual engine operating conditions, resulting in reduced knock and a decrease in an actual substitution ratio relative to the reference substitution ratio. In this way, the reactive knock mitigation feedback loop may prolong a useful life of the engine by reducing a frequency of severe knock events.

Though the method is described below in isolation, the method may be executed in combination with one or more other methods described according to embodiments provided herein, such as the methods of FIGS. 4 and 6. For example, in one embodiment, the method of FIG. 5 may at least partially substitute step 455 in the method described in detail above at FIG. 4.

At step 505, the method may include receiving the specific engine operating state and the reference substitution ratio. The reference substitution ratio may correspond to a value stored in memory of the engine controller and specific to the specific engine operating state. In some embodiments, the reference substitution ratio may be the base substitution ratio, adjusted according to an expected MAT. In additional or alternative embodiments, upon deviation of the actual MAT from the expected MAT, the reference substitution ratio may further be adjusted to account for the deviation. In additional or alternative embodiments, the reference substitution ratio may further be adjusted (e.g., decreased) to mitigate any knock occurring or soon to occur in the cylinder [or, responsive to little or no knocking, the reference substitution ratio may be adjusted (e.g., increased) to maximize fuel cost savings].

In additional or alternative embodiments, the received reference substitution ratio may be transiently adjusted relative to the reference substitution ratio stored in memory of the engine controller. For instance, to prevent "runaway" engine knocking events resulting in severe knocking and engine degradation, one or more engine operating conditions upon which the substitution ratio depends may be actively adjusted (e.g., via a reactive knock mitigation feedback loop) until the engine controller determines that severe knock is no longer likely. In one embodiment, a gas torque limit of the cylinder may be adjusted, resulting in a corresponding adjustment to the reference substitution ratio. In an additional or alternative embodiment, the cylinder may be reassigned from a first cylinder group to a second, knock-prone cylinder group having a different reference substitution ratio.

At step 510, the method may include generating a fueling request based on the specific engine operating state and the reference substitution ratio. Specifically, a total amount, a timing, and a duration of fueling may be determined based on the specific engine operating state (e.g., for regulating an actual engine speed based on an engine speed mapping of the specific engine operating state), while relative amounts of primary (liquid) and secondary (gas) fuels delivered to the cylinder may be determined according to the reference substitution ratio.

At step 515, the method may include injecting the primary and secondary fuels into the cylinder based on the generated fueling request. The primary and secondary fuels may subsequently be combusted to power the engine, wherefrom at least one of the one or more engine operating conditions may be monitored.

For example, at step 520, the method may include receiving knock feedback from one or more knock sensors coupled to the engine. Specifically, the knock feedback may include one or more signals indicative of knocking occurring in the cylinder. In some embodiments, the knock feedback may indicate whether or not knocking is present. In additional or alternative embodiments, if the knock feedback indicates that knocking is present, the knock feedback may further indicate a severity or magnitude of the knocking.

At step 525, the method may include processing the received knock feedback. Specifically, the engine controller may determine the presence of the knocking (or lack thereof) and the severity thereof as indicated by or inferred from the received knock feedback.

At step 530, the method may include determining a knock status based on the processed knock feedback. Specifically, the knock status may include an indication of the presence of the knocking (or lack thereof), a severity of the knocking, and/or a prediction of a severity of future knocking. For example, the one or more signals may indicate that current knocking is a moderate knocking event. However, based on the current knocking and/or previously received signals, the engine controller may predict that the knocking in the cylinder may soon become severe (e.g., the current knocking and/or previously received signals may indicate a "runaway" knocking event).

At step 535, the method may include determining whether the knock status indicates severe knocking in the cylinder. In some embodiments, the knock status indicating severe knocking in the cylinder may include the knock status indicating a severity of knocking in the cylinder greater than or equal to a threshold severity. In additional or alternative embodiments, the knock status indicating severe knocking in the cylinder may include the knock status predicting the severity of the knocking to exceed the threshold severity within a threshold duration.

If the knock status indicates severe knocking in the cylinder (e.g., the severity of the knocking in the cylinder is determined or predicted to be greater than or equal to the threshold severity), the method may proceed to step 540, where the method may include actively adjusting one or more engine operating conditions to mitigate or prevent severe knocking in the cylinder. Specifically, based on the knock status indicating severe knocking in the cylinder (e.g., proportional to a current or predicted severity of knocking in excess of the threshold severity), the one or more engine operating conditions may be actively adjusted such that the actual substitution ratio may be decreased relative to the reference substitution ratio for the specific engine operating state. In one embodiment, a gas torque limit of the cylinder may be decreased, resulting in a decrease in the actual substitution ratio. In an additional or alternative embodiment, the cylinder may be reassigned from a first cylinder group to a second, knock-prone cylinder group having a lower reference substitution ratio, such that the actual substitution ratio may be correspondingly commanded lower. If the knock status does not indicate severe knocking in the cylinder (e.g., the severity of knocking in the cylinder is determined or predicted to remain less than the threshold severity), the method may return.

Figure 6:
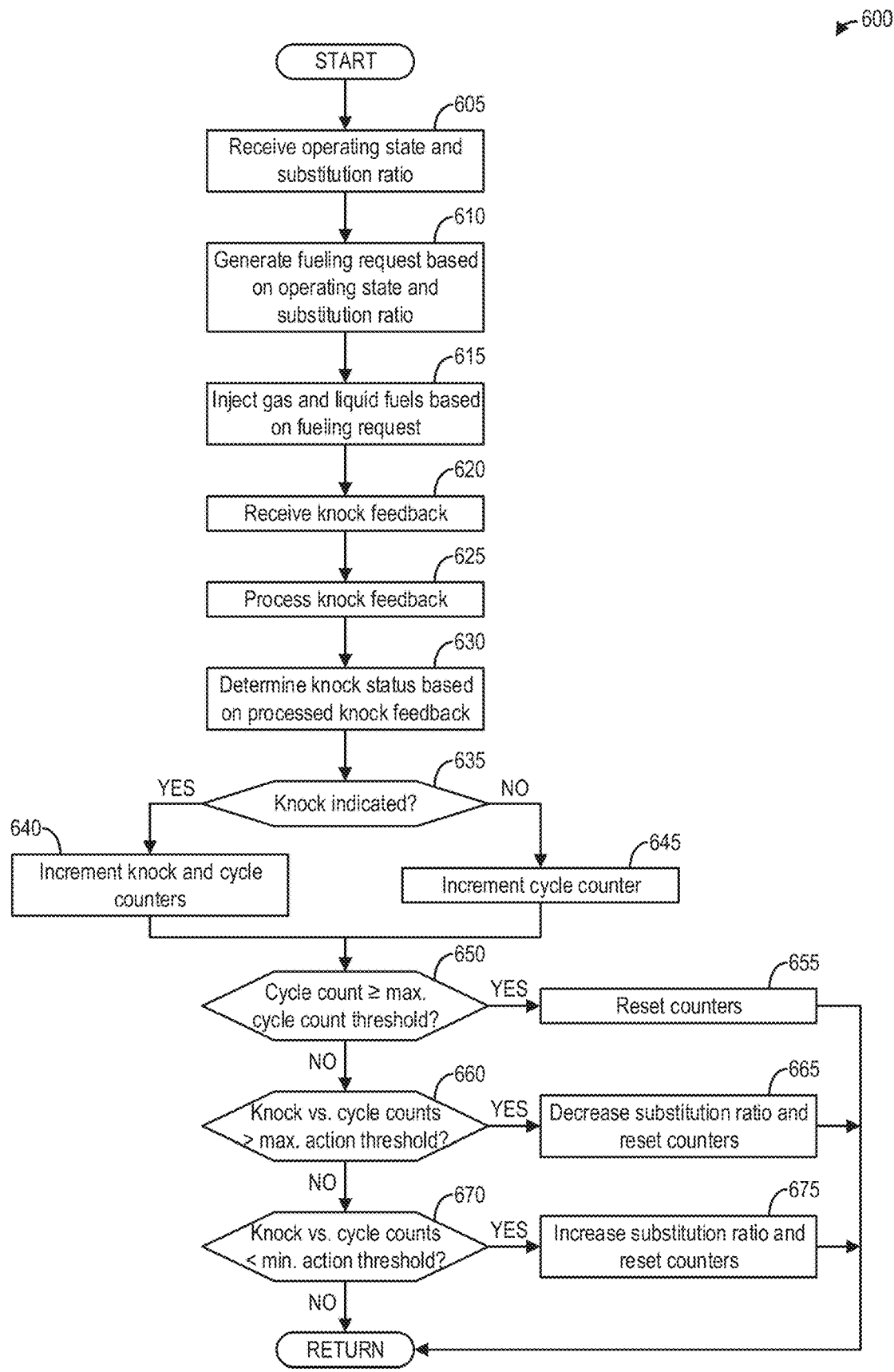
FIG. 6 shows a flow chart of a method for initiating a statistical knock rate control loop for the exemplary cylinder.
Figure 7:
FIG. 7 shows a plot for determining adjustments to a substitution ratio of a multi-fuel engine based on a monitored knock rate.

Referring now to FIG. 6, a flow chart is depicted, showing a method 600 for initiating a statistical knock rate control feedback loop for a cylinder of an engine in a specific engine operating state. The cylinder may be one of a plurality of cylinders configured for multi-fuel operation, such as one of the cylinders described in detail above with reference to FIGS. 1 and 2. The specific engine operating state may correspond to a set of known engine operating conditions stored in memory of the engine controller, which may include a base substitution ratio. However, the specific engine operating state may in actuality be executed based on the set of known engine operating conditions adjusted for one or more actual engine operating conditions. For example, the specific engine operating state may further correspond to a reference substitution ratio, the reference substitution ratio being based on, in one embodiment, the base substitution ratio adjusted according to one or more actual engine operating conditions. As further discussed in detail below, an actual substitution ratio may be based on the base substitution ratio adjusted responsive to a determined knock rate. Specifically, when the knock rate of the engine falls outside of a statistically significant range of expected values for the specific engine operating state (referred to elsewhere herein as a "no action" deadzone), the statistical knock rate control loop may command increases or decreases to the reference substitution ratio such that the reference substitution ratio may be dynamically maximized. In this way, the statistical knock rate control feedback loop may mitigate knock while commanding operation of the cylinder at a maximal substitution ratio (and thereby a minimal fuel cost).

Though the method is described below in isolation, the method may be executed in combination with one or more other methods described according to embodiments provided herein, such as the methods of FIGS. 4 and 5. For example, in one embodiment, the method of FIG. 6 may at least partially substitute step 455 in the method described in detail above at FIG. 4. Further, as the statistical knock rate control feedback loop may be executed in tandem with the reactive knock mitigation feedback loop, at least some steps may be repeated from the method described in detail above at FIG. 5, which will not be described herein again for brevity. Specifically, steps 605, 610, 615, 620, 625, and 630, described in detail below with reference to FIG. 6, may respectively correspond to steps 505, 510, 515, 520, 525, and 530, discussed in detail above with reference to FIG. 5.

Thus, continuing at step 635, the method may include determining whether the knock status indicates knocking in the cylinder. In some embodiments, the knock status indicating knocking in the cylinder may include the knock status indicating a severity or magnitude of any knock feedback (e.g., signals received from one or more knock sensors) greater than an expected value for substantially typical engine operation. In additional or alternative embodiments, the knock status indicating knocking in the cylinder may include the knock status predicting the severity of any knock feedback to exceed the expected value for substantially typical engine operation within a threshold duration.

If the knock status indicates knocking in the cylinder (e.g., the severity of any knock feedback in the cylinder is determined or predicted to be greater than the expected value for substantially typical engine operation), the method may proceed to step 640, where the method may include incrementing each of a knock counter and a combustion cycle counter by one. Accordingly, a single knock event may be recorded for a current combustion cycle of the engine such that the knock rate is increased.

If the knock status does not indicate knocking in the cylinder (e.g., the severity of any knock feedback in the cylinder is determined or predicted to be less than or equal to the expected value for substantially typical engine operation), the method may proceed to step 645, where the method may include incrementing the combustion cycle counter by one. Accordingly, no knock events may be recorded for a current combustion cycle of the engine such that the knock rate is decreased.

At step 650, the method may include determining whether the combustion cycle counter corresponds to a combustion cycle count greater than or equal to a maximum combustion cycle count threshold (e.g., 15 min of combustion cycles for a given engine speed). Specifically, if the knock rate has been maintained within the statistically significant range of expected values for the specific engine operating state for a number of combustion cycles greater than the maximum combustion cycle count threshold, trends of mild or moderate knock events occurring during later cycles may be "washed out" (e.g., overlooked by the statistical knock rate control feedback loop) by substantially typical (no knock) engine operation during earlier combustion cycles. As such, mild or moderate knocking may not be detected until later than desired.

To ensure that statistically significant mild or moderate knock events are detected as early as possible, if the combustion cycle count is determined to be greater than or equal to the maximum combustion cycle count threshold, the method may proceed to step 655, where the method may include resetting each of the knock counter and the combustion cycle counter. In some embodiments, a timer for a selected substitution ratio range (e.g., the full or limited substitution ratio range) may also be reset (however, in additional or alternative embodiments, the timer for the selected substitution ratio range may be independently reset from the knock and combustion cycle counters, e.g., whenever the combustion cycle count reaches another combustion cycle count threshold different from the maximum combustion cycle count threshold, such as three hours for example). In this way, the statistical knock rate control feedback loop may dynamically adjust the reference substitution ratio based on relatively recent knocking trends alone. The method may return.

If the combustion cycle count is determined to be less than the maximum combustion cycle count threshold, the method may proceed to step 660, where the method may include determining whether a ratio of a knock count corresponding to the knock counter to the combustion cycle count (e.g., the knock rate) is greater than a maximum action threshold of the statistically significant range of expected values for the specific engine operating state. Specifically, the statistically significant range may be bounded by the maximum action threshold and a minimum action threshold. In some embodiments, the maximum and minimum action thresholds may respectively correspond to maximum and minimum target knock rates adjusted for statistical uncertainty. For instance, a threshold confidence or a confidence interval (e.g., a binomial proportion confidence interval, such as a Wilson score interval or a Wald interval) may cushion the maximum and minimum target knock rates such that only statistically significant deviations from an expected knock rate (e.g., outside of the confidence interval) may be considered grounds for substitution ratio adjustment. Additionally or alternatively, the expected knock rate may be dynamically determined and adjusted according to one or more functions of a current number of knock events detected in the engine, a current number of combustion cycles of the engine, and a current substitution ratio.

If the knock rate is determined to be greater than the maximum action threshold, the method may proceed to step 665, where the method may include decreasing the reference substitution ratio for the specific engine operating state and resetting each of the knock rate and the combustion cycle counters. Specifically, the reference substitution ratio for the specific engine operating state stored in memory of the engine controller may be updated according to the decreased value, such that, even upon exiting and then reentering the specific engine operating state after a duration, the decreased value may be used as a baseline. In some embodiments, the reference substitution ratio may be decreased according to a fixed step size. Additionally or alternatively, the reference substitution ratio may be decreased proportionally based on the knock rate. In one embodiment, the reference substitution ratio may be decreased by less than 7% of the reference substitution ratio.

In some embodiments, the timer for the selected substitution ratio range (e.g., the full or limited substitution ratio range) may also be reset (however, in additional or alternative embodiments, the timer for the selected substitution ratio range may be independently reset from the knock and combustion cycle counters, e.g., whenever the combustion cycle count reaches another combustion cycle count threshold different from the maximum combustion cycle count threshold, such as three hours for example). In this way, the statistical knock rate control feedback loop may dynamically adjust (e.g., decrease) the reference substitution ratio such that knocking in the engine may be mitigated. The method may return.

If the knock rate is determined to be less than or equal to the maximum action threshold, the method may proceed to step 670, where the method may include determining whether the ratio of the knock count to the combustion cycle count (e.g., the knock rate) is less than the minimum action threshold of the statistically significant range of expected values for the specific engine operating state.

If the knock rate is determined to be less than the minimum action threshold, the method may proceed to step 675, where the method may include increasing the reference substitution ratio for the specific engine operating state and resetting each of the knock rate and the combustion cycle counters. Specifically, the reference substitution ratio for the specific engine operating state stored in memory of the engine controller may be updated according to the increased value, such that, even upon exiting and then reentering the specific engine operating state after a duration, the increased value may be used as a baseline. In some embodiments, the reference substitution ratio may be increased according to a fixed step size. Additionally or alternatively, the reference substitution ratio may be increased proportionally based on the knock rate. In one embodiment, the reference substitution ratio may be increased by less than 3% of the reference substitution ratio.

In some embodiments, the timer for the selected substitution ratio range (e.g., the full or limited substitution ratio range) may also be reset (however, in additional or alternative embodiments, the timer for the selected substitution ratio range may be independently reset from the knock and combustion cycle counters, e.g., whenever the combustion cycle count reaches another combustion cycle count threshold different from the maximum combustion cycle count threshold, such as three hours for example). In this way, the statistical knock rate control feedback loop may dynamically adjust (e.g., increase) the reference substitution ratio such that a fuel cost may be minimized. The method may return.

If the knock rate is determined to be greater than or equal to the minimum action threshold at step 670 and less than or equal to the maximum action threshold at step 660 (e.g., the knock rate is determined to be in the deadband), the reference substitution ratio may not be adjusted immediately following a most recent combustion cycle and the method may return.

Referring now to FIG. 7, a plot 700 depicting a decision space for determining adjustments to a substitution ratio of a multi-fuel engine based on a detected knock rate is showed. Specifically, the multi-fuel engine may include a plurality of cylinders configured for multi-fuel operation, such as in the engine described in detail above with reference to FIGS. 1 and 2. In some embodiments, the multi-fuel engine may be positioned in a rail vehicle, and may operate in a specific engine operating state (e.g., corresponding to a specified substitution ratio range and/or a throttle level requested by an operator of the rail vehicle). The knock rate may be defined as a ratio of a knock count (e.g., a total number of detected knock events over a duration in which the multi-fuel engine operates in the specific engine operating state) to a combustion cycle count (e.g., a total number of combustion cycle events over the duration in which the multi-fuel engine operates in the specific operating state) for one or more of the plurality of cylinders being monitored. The knock count is represented by an ordinate of the plot and the combustion cycle count is represented by the abscissa of the plot. Accordingly, the plot depicts the decision space in terms of the knock rate.

The plot may be determined by logic of an engine controller, such as the controller described in detail above with reference to FIG. 1, and stored in memory thereof. As the engine operates, the plot may be dynamically updated responsive to the detected knock rate being higher or lower than expected, a knock event being detected, and/or a combustion cycle elapsing. As discussed in detail below, adjustment to the substitution ratio (e.g., of a cylinder, of a group of cylinders, or of the plurality of cylinders) may be commanded by the engine controller according to where the detected knock rate falls within the decision space of the plot.

The decision space may be divided into three regions or zones: a "no action" zone 710, a "command decrease" zone 720, and a "command increase" zone 730. Specifically, when the detected knock rate is determined to be in the "no action" zone, no adjustment to the substitution ratio may be commanded; when the detected knock rate is determined to be in the "command decrease" zone, a decrease in the substitution ratio may be commanded; and when the detected knock rate is determined to be in the "command increase" zone, an increase in the substitution ratio may be commanded. The decision space may be bounded by the ordinate (e.g., zero combustion cycle count), the abscissa (e.g., zero knock count), and a maximum combustion cycle limit 706 (the maximum combustion cycle limit ensuring that only relatively recent trends in the detected knock rate are considered).

The decision space may be fully defined based on a plurality of preset values for the specific engine operating state. For example, the plurality of preset values may include an upper knock rate tolerance 701 and a lower knock rate tolerance 702, each defined around an expected knock rate (not shown) and defining a nominal deadzone therebetween (e.g., within which knock rates are expected to deviate under substantially typical engine operating conditions). To determine a space outside of the nominal (expected) deadzone within which knock rates may be permitted to at least transiently stray, the plurality of preset values may further include a target maximum action limit 703 and a target minimum action limit 704. Knock rates less than the target maximum action limit and greater than the target minimum action limit may therefore be considered part of the wider "no action" zone, which may be wholly inclusive of the nominal deadzone. Further based on the target maximum action limit and the target minimum action limit, divisions of the three zones at the maximum combustion cycle limit (e.g., at a vertical line parallel to the ordinate defined by the maximum combustion cycle limit) may be determined.

A confidence interval may be determined around the nominal deadzone according to a statistical model receiving as inputs the upper knock rate tolerance, the lower knock rate tolerance, the target maximum action limit, and the target minimum action limit. In some embodiments, the confidence interval may be a binomial proportion confidence interval, such as a Wilson score interval or a Wald interval. The confidence interval may further be defined on the basis of integer multiples of a standard deviation σ from the nominal deadzone (e.g., a tighter confidence interval of ~68.3% certainty of a statistically significant knock event may correspond to 1σ and a looser confidence interval of ~99.7% certainty of a statistically significant knock event may correspond to 3σ). In additional or alternative embodiments, the confidence interval may further be determined or adjusted by actively altering one or more engine operating conditions of one or more cylinders of the plurality of cylinders until a severity or magnitude of knocking exceeds a threshold severity or magnitude (e.g., bounds of the confidence interval may be defined or refined based on the knock rate at which the severity of knocking exceeds the threshold severity).

In some embodiments, one or more ambient environmental conditions (e.g., one or more of ambient humidity, ambient temperature, ambient pressure, altitude, etc.) may further be received by the statistical model as input. In one embodiment, the one or more ambient environmental conditions may be directly measured. In an additional or alternative embodiment, the one or more ambient environmental conditions may not be directly measured and may instead be probabilistically inferred by the engine controller responsive to specific knock rate trajectories or trends relative to expected values for a given specific engine operating state (as the given specific engine operating state may further assume certain ambient environmental conditions).

In some engine operating scenarios, at least one knock event may be detected soon after the knock and combustion cycle counts are initiated/reset (e.g., at an origin 705). In such scenarios, the at least one knock event may spuriously inflate the detected knock rate beyond a true knock rate (e.g., one knock event in one combustion cycle would correspond to a detected knock rate of 100%). Specifically, if the at least one knock event is not followed by further knock events soon thereafter, the detected knock rate may rapidly drop to at, or near, the expected value (e.g., to the true knock rate) and no statistically significant knocking may in actuality be present. To account for such spurious inflation, the "no action" zone may further include a "cushion" zone 707. The "cushion" zone may expand the "no action" zone beyond the target maximum action limit up to a threshold knock count. As such, the "cushion" zone may prevent undesirable decreases to the substitution ratio as a result of spuriously inflated knock rates during initial knock rate monitoring.

In some embodiments, commanded decreases and increases to the substitution ratio may be determined in fixed step sizes or in accordance with an estimated exponential mapping of the substitution ratio to the knock rate. Though the substitution ratio may theoretically be fully increased to 1 and fully decreased to 0, increases and decreases to the substitution ratio may be limited in practice (e.g., to permit gradual substitution ratio adjustment and adaptation of engine operation thereto). For example, the commanded decrease to the substitution ratio upon the detected knock rate entering the "command decrease" zone may be maintained to less than 7% of the substitution ratio and the commanded increase to the substitution ratio upon the detected knock rate entering the "command increase" zone may be maintained to less than 3% of the substitution ratio.

Three exemplary trajectories of detected knock rate trends are further shown in FIG. 7. Specifically, a first exemplary trajectory 711, a second exemplary trajectory 721, and a third exemplary trajectory 731 are shown beginning at the origin and continuing until each of the knock count and the combustion cycle count are commanded by the engine controller to be reset (and the detected knock rate returns to the origin).

The first exemplary trajectory is shown entirely within the "no action" zone, a corresponding knock rate transiently increasing outside of the nominal deadzone (e.g., above the upper knock rate tolerance). As no action is taken within the "no action" zone, the first exemplary trajectory ends upon reaching the maximum combustion cycle limit (and each of the knock count and the combustion cycle count are commanded to be reset). In this way, the engine controller may command no adjustment to the substitution ratio even while monitoring a knock rate (e.g., when the knock rate remains close to an expected value for the substitution ratio and the specific engine operating state).

The second exemplary trajectory gradually increases above the upper knock rate tolerance as knock events accumulate during combustion cycling, the second exemplary trajectory hovering around the upper knock rate tolerance until the knock rate increases to the target maximum action limit and reaches the "command decrease" zone (and each of the knock count and the combustion cycle count are commanded by the engine controller to be reset). Upon reaching the "command decrease" zone, the second exemplary trajectory ends and the engine controller commands a decrease to the substitution ratio. In this way, the engine controller may command a decrease to the substitution ratio as the knock rate increases (e.g., above a threshold value, such as the target maximum action limit).

The third exemplary trajectory gradually decreases below the lower knock rate tolerance as substantially knock-free combustion cycling proceeds, until the knock rate decreases to the target minimum action limit and reaches the "command increase" zone (and each of the knock count and the combustion cycle count are commanded by the engine controller to be reset). Upon reaching the "command increase" zone, the third exemplary trajectory ends and the engine controller commands an increase to the substitution ratio (e.g., responsive to a relatively low knock rate, the engine controller may determine that the substitution ratio be further increased without significant concern as to increased knock). In this way, the engine controller may command an increase to the substitution ratio as the knock rate decreases (e.g., below a threshold value, such as the target minimum action limit).

To test assumptions of whether increasing a current substitution ratio to a given substitution ratio is expected to increase knocking, one or more cylinders of the plurality of cylinders may be actively perturbed for a set number of combustion cycles according to the given substitution ratio. If, following the active perturbation, the given substitution ratio significantly increases the knock rate in the one or more cylinders, the target minimum action limit may be maintained or adjusted to be further from the lower knock rate tolerance (e.g., such that the commanded increase from the current substitution ratio to the given substitution ratio may be delayed). Additionally or alternatively, if, following the active perturbation, the given substitution ratio substantially maintains (or significantly decreases) the knock rate in the one or more cylinders, the target minimum action limit may be adjusted to be closer to the lower knock rate tolerance (e.g., such that a commanded increase from the current substitution ratio to the given substitution ratio may be advanced).

Similarly, to test assumptions of whether decreasing a current substitution ratio to a given substitution ratio is expected to decrease knocking, one or more cylinders of the plurality of cylinders may be actively perturbed for a set number of combustion cycles according to the given substitution ratio. If, following the active perturbation, the given substitution ratio significantly decreases the knock rate in the one or more cylinders, the target maximum action limit may be maintained or adjusted to be closer to the upper knock rate tolerance (e.g., such that a commanded decrease from the current substitution ratio to the given substitution ratio may be advanced). Additionally or alternatively, if, following the active perturbation, the given substitution ratio substantially maintains (or significantly increases) the knock rate in the one or more cylinders, the target maximum action limit may be adjusted to be further from the upper knock rate tolerance (e.g., such that the commanded decrease from the current substitution ratio to the given substitution ratio may be delayed).

Additionally or alternatively, changes in the one or more ambient environmental conditions may be accounted for via active adjustment of one or more engine operating conditions such that the "no action" zone may be expanded within and across the various specific engine operating states and/or active cylinder perturbation and response routines, such as those described in detail above, may be executed without significant engine degradation for expanded engine operating conditions. For example, a turbocharger boost pressure and/or exhaust gas recirculation may be actively adjusted such that oxygen supplied to the engine may be correspondingly adjusted to account for changes in ambient pressure (e.g., due to altitude or ambient temperature changes). Accordingly, knocking may be mitigated across variable ambient environments via dynamic adjustments to engine operation.

A method may be provided for mitigating knock and maximizing a substitution ratio of a plurality of cylinders of an engine via multiple feedback loops or operating modes. In one embodiment, a reactive knock mitigation loop and a statistical knock rate control loop may be executed in tandem to mitigate knock across a range of severity levels. The statistical knock rate control loop may command adjustments to the substitution ratio on a relatively slow timescale, such that increases or decreases to the substitution ratio are made only when a determined knock rate strays outside of a confidence interval of a "no action" deadband (e.g., during and/or preceding mild or moderate knock events). Since the determined knock rate may normalize a number of knock events over a number of combustion cycles and since the confidence intervals may be periodically updated, only statistically significant deviations from expected values may result in adjustments to the substitution ratio. A technical effect of using a statistical model to adjust the substitution ratio as provided herein is that even mild and moderate knock may be adaptively mitigated through dynamic, data-driven updates to both the statistical model and reference values defining the various engine operating states (e.g., the adjusted substitution ratio may be employed to update a reference substitution ratio for a given engine operating state, such that knock may be mitigated in the long term).

Further, by pairing the statistical knock rate control loop with the reactive knock mitigation loop, substantially immediate adjustments to engine operating conditions on which the substitution ratio depends (e.g., gas torque limits, cylinder set definitions) may be commanded on a relatively fast timescale to mitigate severe knock resulting from rapid, "runaway" knocking scenarios less manageable by the statistical model.

Thus, embodiments provided herein may mitigate or entirely eliminate mild, moderate, and severe knocking via a combination of reactive transient adjustments to one or more current engine operating conditions and dynamic updates to one or more reference engine operating conditions for various engine operating states, responsive to deviations of knock rates from expected values. In additional or alternative embodiments, a current or reference fuel substitution ratio may be adjusted responsive to deviations of one or more other engine operating conditions (e.g., MAT, ambient pressure, etc.) from respective expected values according to the plurality of feedback loops described herein, such that knocking may be mitigated while still retaining a relatively low order approximation of further, less controllable engine operating conditions. Further, though one embodiment provided herein is described in the context of adjusting a current or reference fuel substitution ratio to prevent knocking, other embodiments are not limited to substitution ratio adjustment, and may be applied to one or more further current and/or reference engine operating conditions, such as inlet air temperature, diesel injection timing (e.g., in a diesel engine), spark timing (e.g., in a gasoline spark-ignition engine), and rail pressure (e.g., in a direct injection engine). For example, one or more current engine operating conditions may be adjusted in a gasoline spark-ignition engine, resulting in a current spark timing being adjusted responsive to one or more of a knock rate, a manifold air temperature, and an ambient pressure (e.g., deviating from respective expected values) so as to mitigate detected knocking. In this way, one or more engine operating conditions may be optimized while mitigating knock across a broad range of severity.

In one example, a method for a multi-fuel engine is provided. The method may include: monitoring a frequency of knock events corresponding to one or more cylinders of the multi-fuel engine; and in a first mode, dynamically increasing a substitution ratio of the one or more cylinders while the frequency of knock events is less than a maximum action threshold. In one embodiment, the method further includes wherein dynamically increasing the substitution ratio while the frequency of knock events is less than the maximum action threshold comprises: responsive to the frequency of knock events decreasing below a minimum action threshold, commanding the substitution ratio increased; and responsive to the frequency of knock events increasing to less than the maximum action threshold while being greater than the minimum action threshold, commanding no adjustment to the substitution ratio. In one embodiment, optionally including one or more of the preceding embodiments, the method further comprises, in a second mode, and responsive to the frequency of knock events increasing above the maximum action threshold, commanding the substitution ratio decreased. In one embodiment, optionally including one or more of the preceding embodiments, the method further includes wherein the maximum action threshold is selected to dynamically adjust the substitution ratio such that the frequency of knock events is prevented from deviating outside of a threshold confidence of an expected frequency. In one embodiment, optionally including one or more of the preceding embodiments, the method further comprises determining a severity of knocking in the one or more cylinders, wherein dynamically increasing the substitution ratio is further responsive to the severity of knocking being indicated less than a threshold severity. In one embodiment, optionally including one or more of the preceding embodiments, the method further comprises, responsive to the severity of knocking being indicated greater than or equal to the threshold severity, actively adjusting one or more engine operating conditions to decrease the substitution ratio. In one embodiment, optionally including one or more of the preceding embodiments, the method further includes wherein the severity of knocking being indicated greater than or equal to the threshold severity comprises one or more of: receiving a determination that the severity of knocking is currently greater than or equal to the threshold severity, and receiving a prediction that the severity of knocking will exceed the threshold severity within a threshold duration. In one embodiment, optionally including one or more of the preceding embodiments, the method further includes wherein actively adjusting the one or more engine operating conditions to decrease the substitution ratio comprises one or more of: decreasing a gas torque limit of each of the one or more cylinders, and reassigning the one or more cylinders from a first cylinder group to a second cylinder group, the second cylinder group having a lower reference substitution ratio than the first cylinder group.

In another example, a system is provided that includes an engine. The engine may have a plurality of engine cylinders. An engine controller may be communicably coupled to the engine. The engine controller may execute instructions that are stored in non-transitory memory to: operate the engine according to an operator-requested engine operating state; and responsive to: at least one engine cylinder of the plurality of engine cylinders entering multi-fuel operation, receiving an indication of knocking in the at least one engine cylinder, and during a first mode of engine operation, determining the knocking to be significant based on a rate of knocking per combustion cycle in the at least one engine cylinder (e.g., as determined based on the indication) being outside of a statistical confidence interval of an expected rate: adjust a substitution ratio for the at least one engine cylinder to mitigate the significant knocking. In one embodiment, the system further includes wherein the substitution ratio is not adjusted when an engine power corresponding to the operator-requested engine operating state is less than a threshold engine power. In one embodiment, optionally including one or more of the preceding embodiments, the system further includes wherein the instructions are further executable to, prior to adjusting the substitution ratio: responsive to the operator-requested engine operating state not having been previously requested for greater than or equal to a threshold duration, operate the at least one engine cylinder according to a base substitution ratio for the operator-requested engine operating state; and responsive to the operator-requested engine operating state having been previously requested within the threshold duration, operate the at least one engine cylinder according to a most recently determined substitution ratio for the operator-requested engine operating state. In one embodiment, optionally including one or more of the preceding embodiments, the system further includes wherein the statistical confidence interval is adaptively adjusted based on one or more of the substitution ratio and the indication of knocking. In one embodiment, optionally including one or more of the preceding embodiments, the system further includes wherein the instructions are further executable to adjust the substitution ratio for the at least one engine cylinder responsive to, during a second mode of engine operation, determining the knocking to be significant based on a severity of knocking in the at least one engine cylinder (e.g., as determined based on the indication) being greater than or equal to a threshold severity. In one embodiment, optionally including one or more of the preceding embodiments, the system further includes wherein adjusting the substitution ratio for the at least one engine cylinder comprises: during the first mode of engine operation, adjusting a reference substitution ratio corresponding to the operator-requested engine operating state such that the substitution ratio for the at least one engine cylinder is adjusted for a first duration; and during the second mode of engine operation, transiently adjusting one or more engine operating conditions such that the substitution ratio for the at least one engine cylinder is adjusted for a second duration, and wherein the first duration is longer than the second duration. In one embodiment, optionally including one or more of the preceding embodiments, the system further includes wherein the engine is configured to power a rail vehicle.

In another example, a system for an engine is provided. The engine may include a plurality of cylinders susceptible to knocking; and a controller executing instructions stored in non-transitory memory to: detect knocking in one or more of the plurality of cylinders; responsive to a severity of the detected knocking being less than a threshold severity: dynamically update one or more reference engine operating conditions stored in non-transitory memory, and operate the engine according to the one or more dynamically updated reference engine operating conditions to mitigate the detected knocking; and responsive to the severity of the detected knocking being greater than or equal to the threshold severity, adjust one or more current engine operating conditions without updating the one or more reference engine operating conditions to mitigate the detected knocking. In one embodiment, the system further includes wherein the one or more reference engine operating conditions comprises one or more of a reference inlet air temperature, a reference diesel injection timing, a reference spark timing, a reference rail pressure, and a reference fuel substitution ratio. In one embodiment, optionally including one or more of the preceding embodiments, the system further includes wherein the engine is a gasoline spark-ignition engine, wherein the one or more reference engine operating conditions comprises the reference spark timing. Adjusting the one or more current engine operating conditions to mitigate the detected knocking may result in a current spark timing being adjusted (e.g., responsive to one or more of a knock rate, a manifold air temperature, and an ambient pressure) so as to mitigate the detected knocking. In one embodiment, optionally including one or more of the preceding embodiments, the system further includes wherein the engine is a multi-fuel engine, wherein the one or more reference engine operating conditions comprises the reference fuel substitution ratio, and wherein adjusting the one or more current engine operating conditions to mitigate the detected knocking is responsive to one or more of a knock rate, a manifold air temperature, and an ambient pressure deviating from respective expected values. Adjusting the one or more current engine operating conditions may result in a current fuel substitution ratio being adjusted so as to mitigate the detected knocking. In one embodiment, optionally including one or more of the preceding embodiments, the engine is a power source for a locomotive.

In yet another example, a system for a multi-fuel engine is provided. The system may include a controller storing instructions in non-transitory memory, the instructions executable to control a ratio of gaseous fuel supplied to the multi-fuel engine to liquid fuel supplied to the multi-fuel engine based on a statistical knock rate control feedback loop, the statistical knock rate control feedback loop defining each of a first operating mode and a second operating mode of the multi-fuel engine, by: operating the multi-fuel engine in the first operating mode responsive to a knock rate being less than a first threshold knock rate, and operating the multi-fuel engine in the second operating mode responsive to the knock rate being greater than or equal to the first threshold knock rate, wherein the ratio is higher in the first operating mode than in the second operating mode, wherein the first threshold knock rate is dynamically determined according to a first function of a current number of knock events, a current number of combustion cycles, and a current ratio of gaseous fuel supplied to the multi-fuel engine to liquid fuel supplied to the multi-fuel engine, and wherein the first threshold knock rate is adjusted responsive to one or more ambient environmental conditions. In one embodiment, the system further includes wherein the one or more ambient environmental conditions comprises one or more of ambient humidity, ambient temperature, ambient pressure, and altitude. In one embodiment, optionally including one or more of the preceding embodiments, the system further includes wherein the instructions are further executable to infer the one or more ambient environmental conditions based on the knock rate. In one embodiment, optionally including one or more of the preceding embodiments, the system further includes wherein the instructions are further executable to adjust the ratio based on one or more of a severity of knocking being greater than a threshold severity and a relative location of either a cylinder of the multi-fuel engine or a cylinder group of the multi-fuel engine at which the knocking is identified. In one embodiment, optionally including one or more of the preceding embodiments, the system further includes wherein at least one cylinder of the multi-fuel engine is permitted to knock in the first operating mode. In one embodiment, optionally including one or more of the preceding embodiments, the system further includes wherein the knock rate is defined as a ratio of a number of knock events over a duration of engine operation to a number of combustion cycles over the duration of engine operation. In one embodiment, optionally including one or more of the preceding embodiments, the system further includes wherein the first threshold knock rate is maintained or decreased responsive to a transient increase to the current ratio for at least one cylinder of the multi-fuel engine increasing the knock rate, and wherein the first threshold knock rate is increased responsive to the transient increase maintaining the knock rate. In one embodiment, optionally including one or more of the preceding embodiments, the system further includes wherein the ratio in the first operating mode is maintained within 3% of the ratio in the second operating mode. In one embodiment, optionally including one or more of the preceding embodiments, the system further includes wherein the statistical knock rate control feedback loop further defines a third operating mode of the multi-fuel engine, wherein the instructions are further executable to operate the multi-fuel engine in the third operating mode responsive to the knock rate being greater than a second threshold knock rate, wherein the second threshold knock rate is greater than the first threshold knock rate, wherein the ratio is higher in the second operating mode than in the third operating mode, wherein the second threshold knock rate is dynamically determined according to a second function of the current number of knock events, the current number of combustion cycles, and the current ratio, and wherein the second threshold knock rate is adjusted responsive to the one or more ambient environmental conditions. In one embodiment, optionally including one or more of the preceding embodiments, the system further includes wherein the ratio in the third operating mode is maintained within 7% of the ratio in the second operating mode. In one embodiment, optionally including one or more of the preceding embodiments, the system further includes wherein the second threshold knock rate is maintained or decreased responsive to a transient decrease to the current ratio for at least one cylinder of the multi-fuel engine decreasing the knock rate, and wherein the second threshold knock rate is increased responsive to the transient decrease maintaining the knock rate. In one embodiment, optionally including one or more of the preceding embodiments, the system further includes wherein the first and second threshold knock rates are determined as respective bounds to a confidence interval, the confidence interval adaptively determined according to a statistical model. In one embodiment, optionally including one or more of the preceding embodiments, the system further includes wherein the statistical model includes one or more of a probabilistic model, a machine learning based model, and an artificial intelligence based model. In one embodiment, optionally including one or more of the preceding embodiments, the system further includes wherein the statistical model receives the one or more ambient environmental conditions as input. In one embodiment, optionally including one or more of the preceding embodiments, the system further includes wherein the confidence interval is determined by actively altering one or more operating conditions of at least one cylinder of the multi-fuel engine at the current ratio until a severity of knocking exceeds a threshold severity.

As used herein, an element or step recited in the singular and preceded with the word "a" or "an" should be understood as not excluding plural of said elements or steps, unless such exclusion is explicitly stated. Furthermore, references to "one embodiment" or "one example" of the invention do not exclude the existence of additional embodiments that also incorporate the recited features. Moreover, unless explicitly stated to the contrary, embodiments comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method executed by a controller of a multi-fuel engine comprising instructions stored in non-transitory memory of the controller, the method comprising:
   monitoring a frequency of knock events corresponding to one or more cylinders of the multi-fuel engine entering multi-fuel operation; and
   in a first mode, dynamically increasing a substitution ratio of the one or more cylinders while the frequency of knock events is less than a maximum action threshold.

2. The method of claim 1, wherein dynamically increasing the substitution ratio while the frequency of knock events is less than the maximum action threshold comprises:
   responsive to the frequency of knock events decreasing below a minimum action threshold, commanding the substitution ratio increased; and
   responsive to the frequency of knock events increasing to less than the maximum action threshold while being greater than the minimum action threshold, commanding no adjustment to the substitution ratio.

3. The method of claim 1, further comprising, in a second mode, and responsive to the frequency of knock events increasing above the maximum action threshold, commanding the substitution ratio decreased.

4. The method of claim 1, wherein the maximum action threshold is selected to dynamically adjust the substitution ratio such that the frequency of knock events is prevented from deviating outside of a threshold confidence of an expected frequency.

5. The method of claim 1, further comprising determining a severity of knocking in the one or more cylinders,
   wherein dynamically increasing the substitution ratio is further responsive to the severity of knocking being indicated less than a threshold severity.

6. The method of claim 5, further comprising, responsive to the severity of knocking being indicated greater than or equal to the threshold severity, actively adjusting one or more engine operating conditions to decrease the substitution ratio.

7. The method of claim 6, wherein the severity of knocking being indicated greater than or equal to the threshold severity comprises one or more of:
   receiving a determination that the severity of knocking is currently greater than or equal to the threshold severity, and
   receiving a prediction that the severity of knocking will exceed the threshold severity within a threshold duration.

8. The method of claim 6, wherein actively adjusting the one or more engine operating conditions to decrease the substitution ratio comprises one or more of:
   decreasing a gas torque limit of each of the one or more cylinders, and
   reassigning the one or more cylinders from a first cylinder group to a second cylinder group, the second cylinder group having a lower reference substitution ratio than the first cylinder group.

9. A system, comprising:
   an engine comprising a plurality of engine cylinders; and
   an engine controller communicably coupled to the engine, the engine controller executing instructions stored in non-transitory memory to:
      operate the engine according to an operator-requested engine operating state; and
      responsive to:
         at least one engine cylinder of the plurality of engine cylinders entering multi-fuel operation,
         receiving an indication of knocking in the at least one engine cylinder, and
         during a first mode of engine operation, determining the knocking to be significant based on a rate of knocking per combustion cycle in the at least one engine cylinder being outside of a statistical confidence interval of an expected rate:
            adjust a substitution ratio for the at least one engine cylinder to mitigate the significant knocking.

10. The system of claim 9, wherein the substitution ratio is not adjusted when an engine power corresponding to the operator-requested engine operating state is less than a threshold engine power.

11. The system of claim 9, wherein the instructions are further executable to, prior to adjusting the substitution ratio:
   responsive to the operator-requested engine operating state not having been previously requested for greater than or equal to a threshold duration, operate the at least one engine cylinder according to a base substitution ratio for the operator-requested engine operating state; and
   responsive to the operator-requested engine operating state having been previously requested within the threshold duration, operate the at least one engine cylinder according to a most recently determined substitution ratio for the operator-requested engine operating state.

12. The system of claim 9, wherein the statistical confidence interval is adaptively adjusted based on one or more of the substitution ratio and the indication of knocking.

13. The system of claim 9, wherein the instructions are further executable to adjust the substitution ratio for the at least one engine cylinder responsive to, during a second mode of engine operation, determining the knocking to be significant based on a severity of knocking in the at least one engine cylinder being greater than or equal to a threshold severity.

14. The system of claim 13, wherein adjusting the substitution ratio for the at least one engine cylinder comprises:
   during the first mode of engine operation, adjusting a reference substitution ratio corresponding to the operator-requested engine operating state such that the substitution ratio for the at least one engine cylinder is adjusted for a first duration; and during the second mode of engine operation, transiently adjusting one or more engine operating conditions such that the substitution ratio for the at least one engine cylinder is adjusted for a second duration, and wherein the first duration is longer than the second duration.

15. The system of claim 9, wherein the engine is configured to power a rail vehicle.

16. A system for an engine, the system comprising:

a plurality of cylinders susceptible to knocking; and a controller executing instructions stored in non-transitory memory to:

detect knocking in one or more of the plurality of cylinders entering multi-fuel operation;

responsive to a severity of the detected knocking being less than a threshold severity:

dynamically update one or more reference engine operating conditions stored in non-transitory memory, and operate the engine according to the one or more dynamically updated reference engine operating conditions to mitigate the detected knocking; and responsive to the severity of the detected knocking being greater than or equal to the threshold severity, adjust one or more current engine operating conditions to adjust a substitution ratio without updating the one or more reference engine operating conditions to mitigate the detected knocking.

17. The system of claim 16, wherein the one or more reference engine operating conditions comprises one or more of a reference inlet air temperature, a reference diesel injection timing, a reference spark timing, a reference rail pressure, and a reference fuel substitution ratio.

18. The system of claim 17, wherein the engine is a gasoline spark-ignition engine, wherein the one or more reference engine operating conditions comprises the reference spark timing, and wherein adjusting the one or more current engine operating conditions to mitigate the detected knocking results in a current spark timing being adjusted so as to mitigate the detected knocking.

19. The system of claim 17, wherein the engine is a multi-fuel engine, wherein the one or more reference engine operating conditions comprises the reference fuel substitution ratio, and wherein adjusting the one or more current engine operating conditions to mitigate the detected knocking is responsive to one or more of a knock rate, a manifold air temperature, and an ambient pressure deviating from respective expected values and results in the substitution ratio being adjusted so as to mitigate the detected knocking.

20. The system of claim 16, wherein the engine is a power source for a locomotive.

* * * * *